United States Patent
Kawai et al.

(10) Patent No.: US 8,180,215 B2
(45) Date of Patent: May 15, 2012

(54) VIBRATING DEVICE AND IMAGE EQUIPMENT HAVING THE SAME

(75) Inventors: Sumio Kawai, Hachioji (JP); Takashi Miyazawa, Hachioji (JP)

(73) Assignees: Olympus Corporation (JP); Olympus Imaging Corp. (JP)

( * ) Notice: Subject to any disclaimer, the term of this patent is extended or adjusted under 35 U.S.C. 154(b) by 21 days.

(21) Appl. No.: 12/643,041

(22) Filed: Dec. 21, 2009

(65) Prior Publication Data

US 2010/0165462 A1 Jul. 1, 2010

(30) Foreign Application Priority Data

Dec. 26, 2008 (JP) ................................ 2008-335068
Nov. 18, 2009 (JP) ................................ 2009-262657

(51) Int. Cl.
G03B 17/48 (2006.01)
G03B 13/16 (2006.01)
A47L 13/502 (2006.01)

(52) U.S. Cl. .............................. 396/429; 348/335; 15/94
(58) Field of Classification Search ................... 396/55, 396/429, 439; 348/335, 360; 359/507; 15/94
See application file for complete search history.

(56) References Cited

U.S. PATENT DOCUMENTS

| 2004/0169761 A1 | 9/2004 | Kawai et al. | 348/335 |
| 2010/0165186 A1* | 7/2010 | Kawai et al. | 348/375 |

FOREIGN PATENT DOCUMENTS

| JP | 2007-228246 | 9/2007 |
| JP | 2008-026530 | 2/2008 |

OTHER PUBLICATIONS

JP2008-026530 Machine Translation available from JPO website.*
English translation of Chinese Office Action issued in connection with corresponding Chinese application provided as an explanation of prior art relevancy.
Chinese Office Action mailed Apr. 1, 2011 in connection with corresponding Chinese Patent Application No. 200910258828.6.
English translation of Chinese Office Action issued in connection with corresponding Chinese application provided as an explanation of prior art relevancy, Apr. 1, 2011.

* cited by examiner

*Primary Examiner* — W. B. Perkey
*Assistant Examiner* — Minh Phan
(74) *Attorney, Agent, or Firm* — Ostrolenk Faber LLP

(57) ABSTRACT

A vibrating device includes a drive unit configured to drive a vibrating member to produce vibration Z (x, y) at a dust-screening member, the vibration being expressed as follows:

$$Z(x,y) = W_{mn}(x,y) \cdot \cos(\gamma) + W_{nm}(x,y) \cdot \sin(\gamma)$$

where Z (x, y) is vibration at a given point P (x, y) on the dust-screening member, m and n are positive integers including 0, indicating the order of natural vibration corresponding to a vibrational mode, $$W_{mn}(x, y) = \sin\left(n\pi \cdot x + \frac{\pi}{2}\right) \cdot \sin\left(m\pi \cdot y + \frac{\pi}{2}\right),$$

$$W_{nm}(x, y) = \sin\left(m\pi \cdot x + \frac{\pi}{2}\right) \cdot \sin\left(n\pi \cdot y + \frac{\pi}{2}\right), \text{ and}$$

$\gamma$ is $+\pi/4$ or ranges from $-\pi/8$ to $-\pi/4$. A ratio between a first bending rigidity along the X-axis of at least the dust-screening member and vibrating member in the section orthogonal to the X-axis at the intersection of the X- and Y-axes, to a second bending rigidity along the Y-axis of at least the dust-screening member and vibrating member in the section orthogonal to the Y-axis at the intersection is 0.4 or more, but less than 1.0.

16 Claims, 17 Drawing Sheets

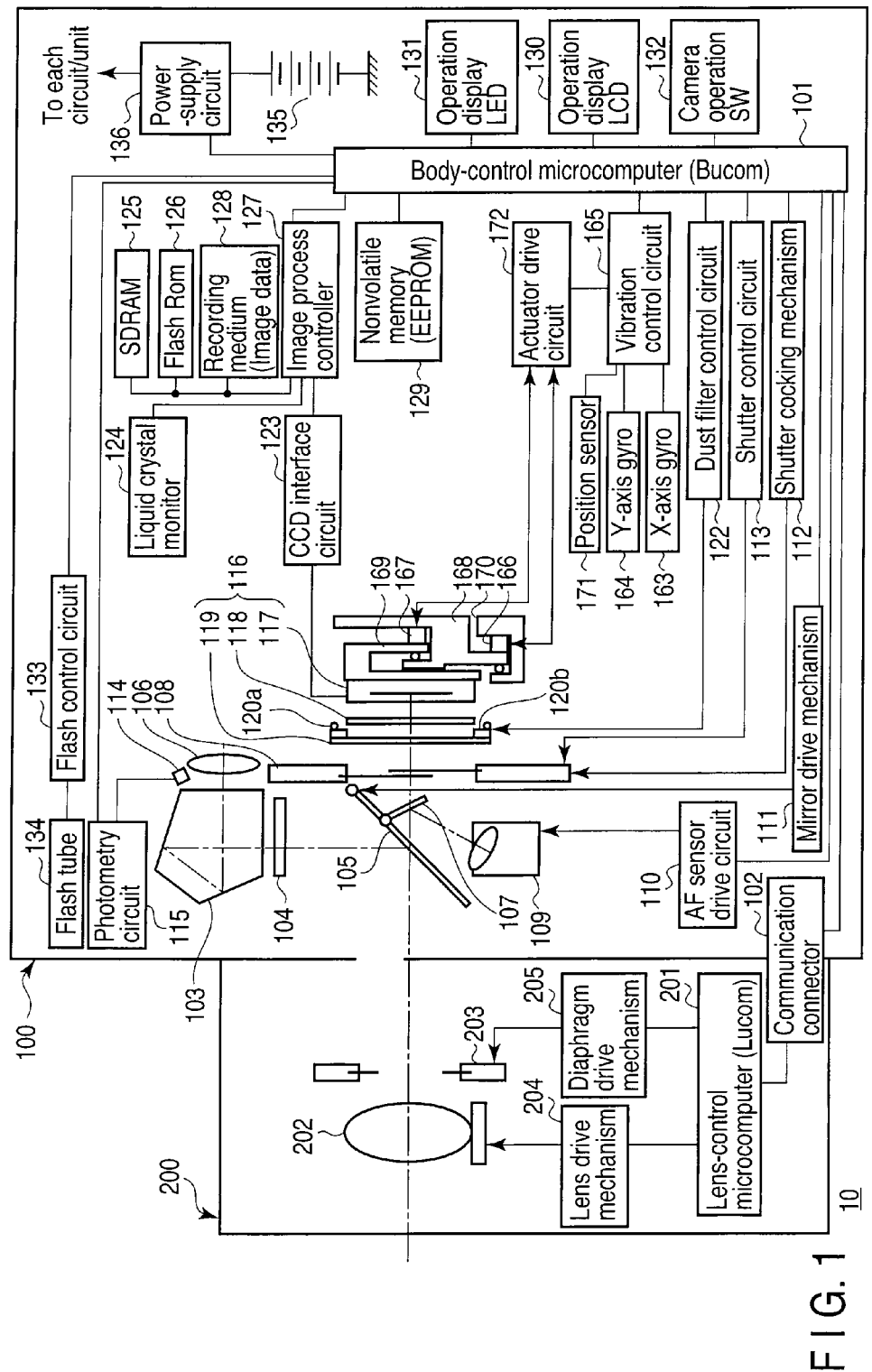
F I G. 1

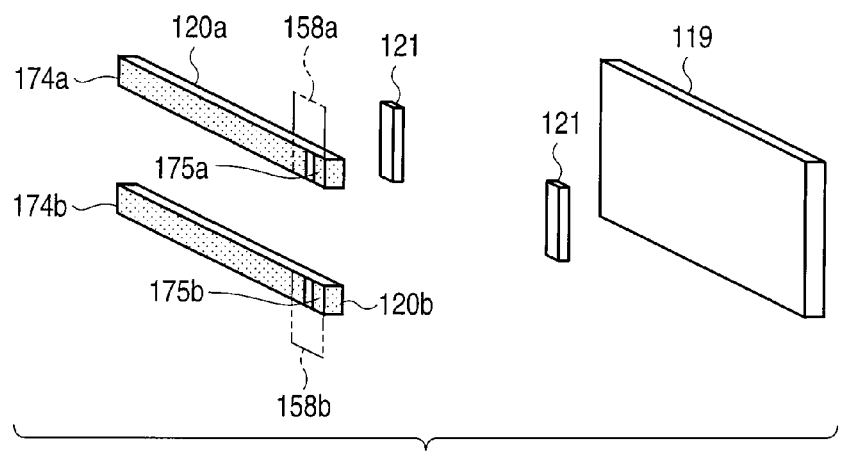
F I G. 3
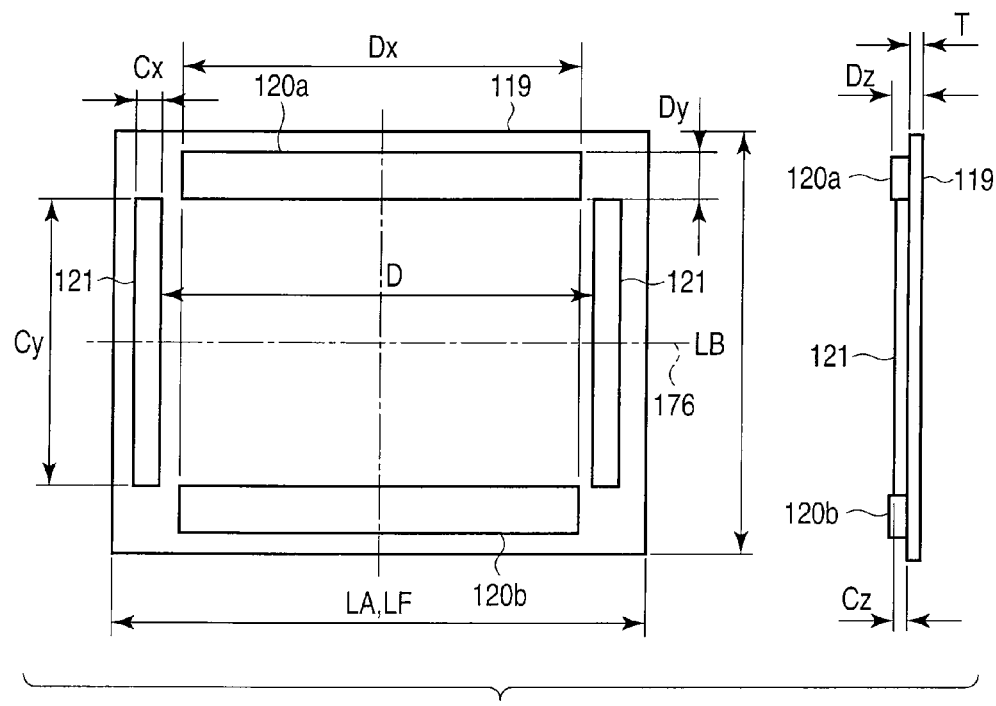
F I G. 5

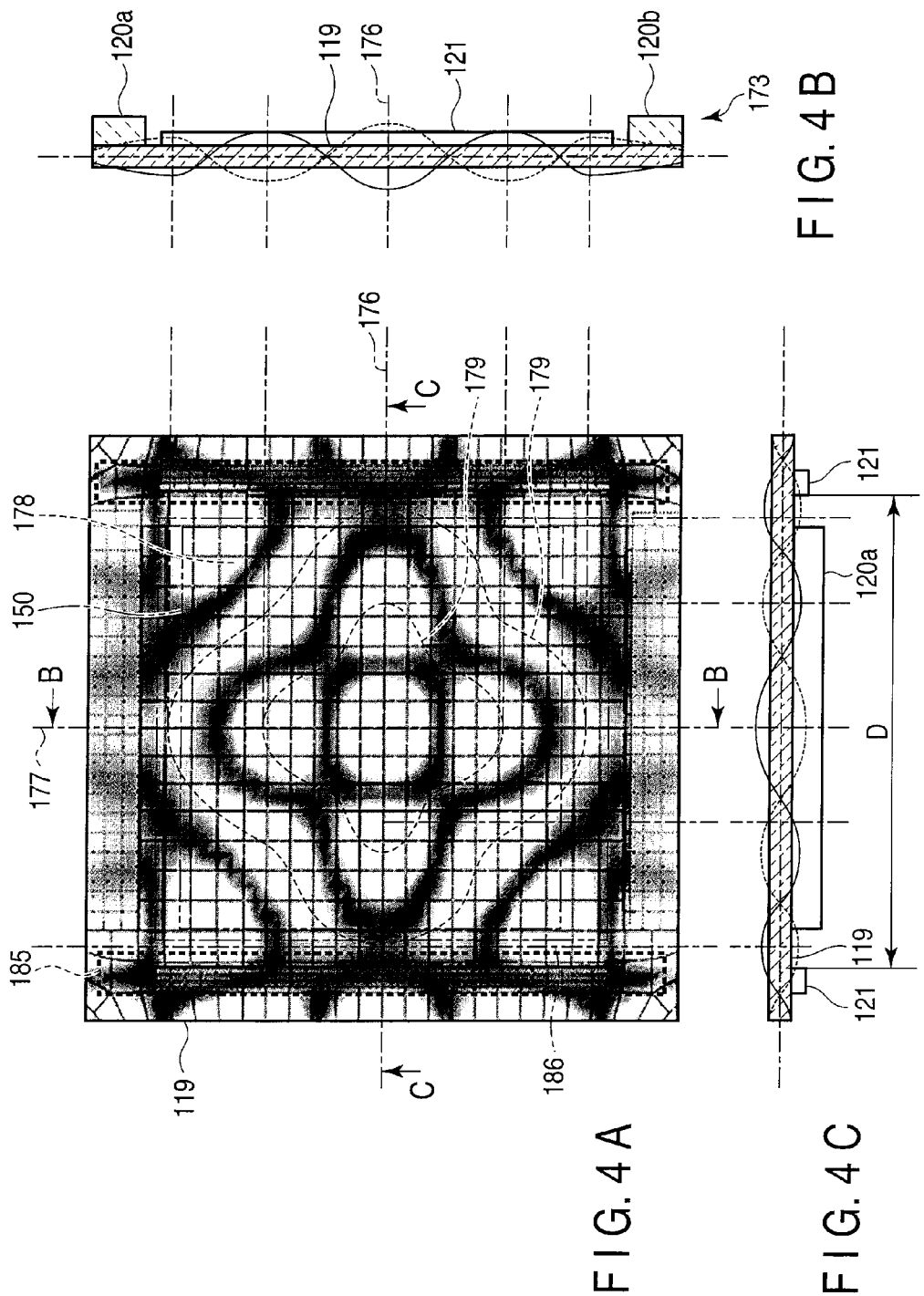

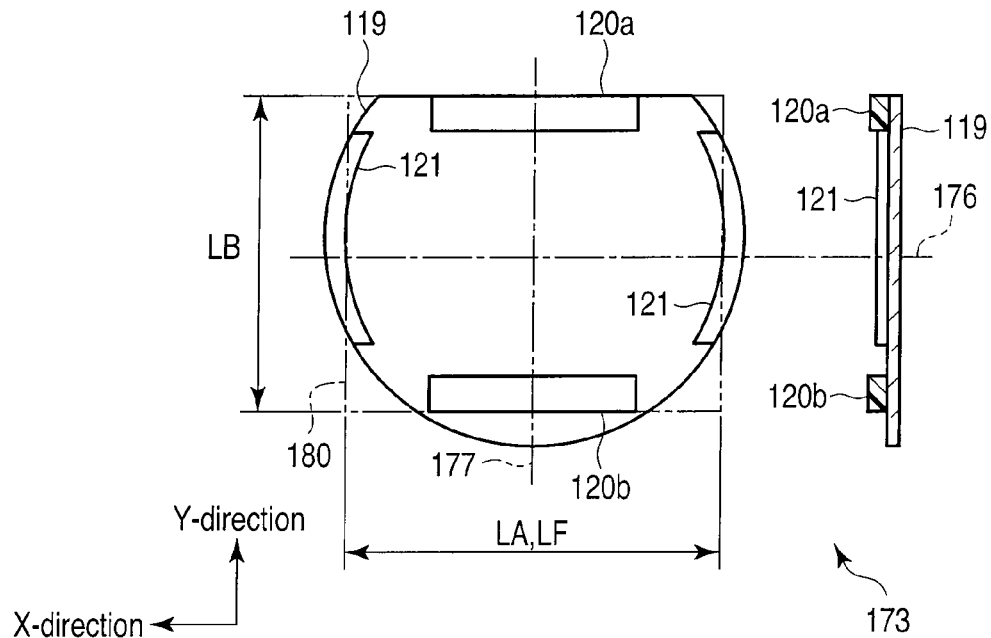
F I G. 1 1
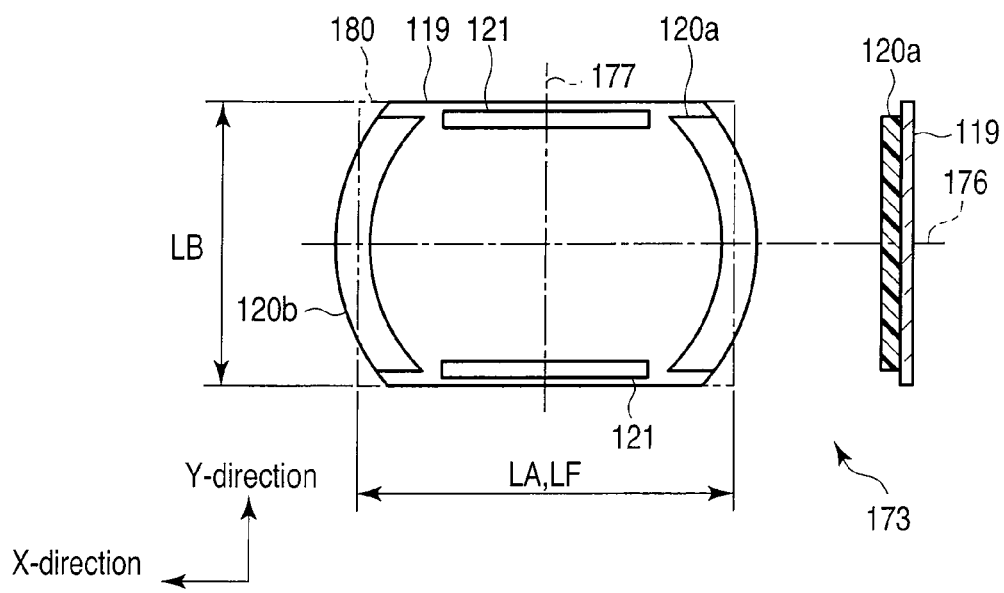
F I G. 1 2

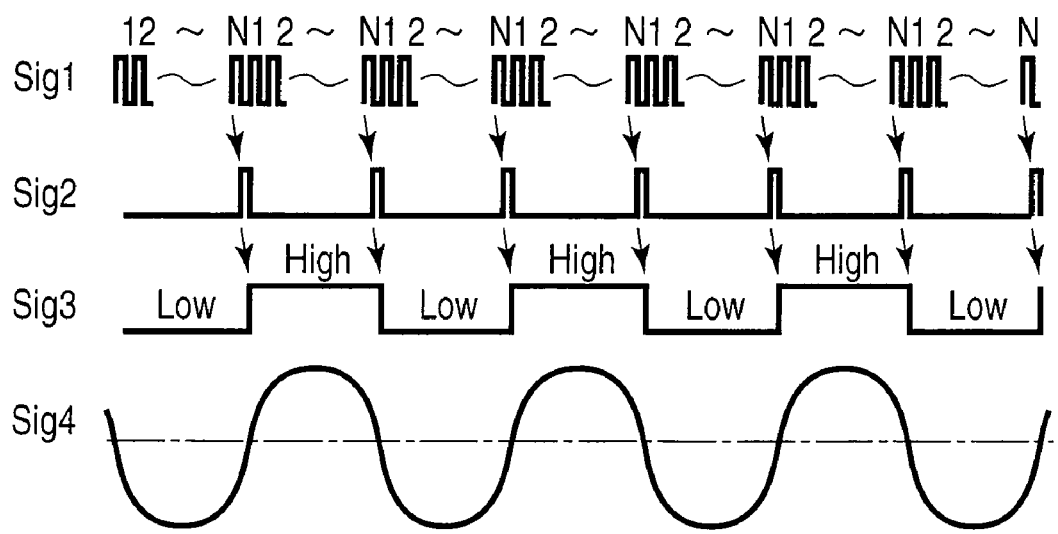
F I G. 16

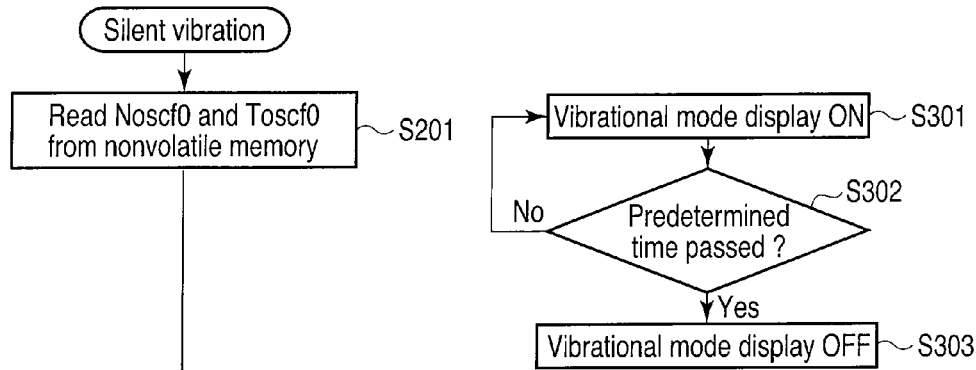
FIG. 19
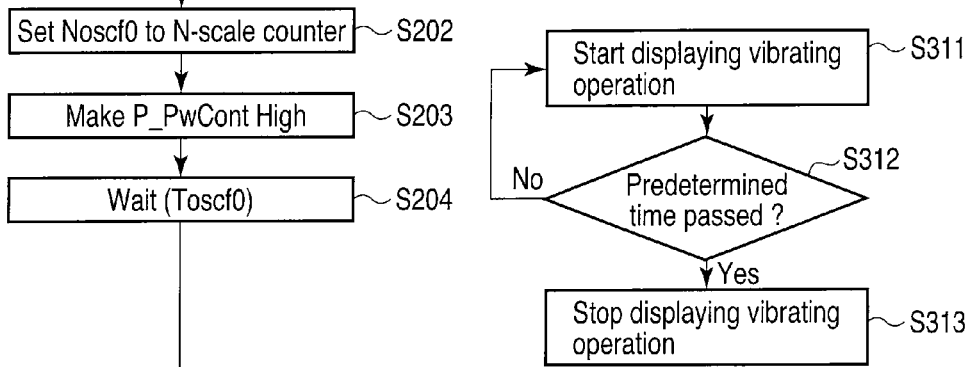
FIG. 18
FIG. 20
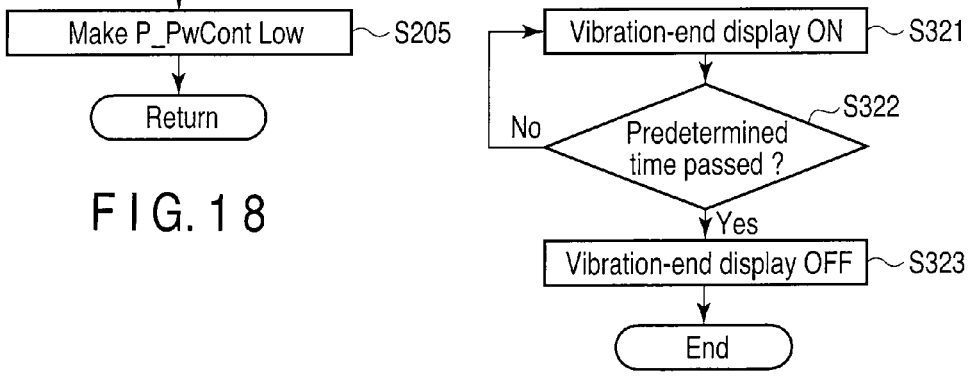
FIG. 21

VIBRATING DEVICE AND IMAGE EQUIPMENT HAVING THE SAME

CROSS-REFERENCE TO RELATED APPLICATIONS

This application is based upon and claims the benefit of priority from prior Japanese Patent Applications No. 2008-335068, filed Dec. 26, 2008; and No. 2009-262657, filed Nov. 18, 2009, the entire contents of both of which are incorporated herein by reference.

BACKGROUND OF THE INVENTION

1. Field of the Invention

The present invention relates to image equipment having image forming elements such as an image sensor element or a display element, and also to a vibrating device designed to vibrate the dust-screening member that is arranged at the front of each image forming element of such an image equipment.

2. Description of the Related Art

As image equipment having image forming elements, there is known an image acquisition apparatus that has an image sensor element configured to produce a video signal corresponding to the light applied to its photoelectric conversion surface. Also known is an image projector that has a display element, such as liquid crystal element, which displays an image on a screen. In recent years, image equipment having such image forming elements have been remarkably improved in terms of image quality. If dust adheres to the surface of the image forming element such as the image sensor element or display element or to the surface of the transparent member (optical element) that is positioned in front of the image forming element, the image produced will have shadows of the dust particles. This makes a great problem.

For example, digital cameras of called "lens-exchangeable type" have been put to practical use, each comprising a camera body and a photographic optical system removably attached to the camera body. The lens-exchangeable digital camera is so designed that the user can use various kinds of photographic optical systems, by removing the photographic optical system from the camera body and then attaching any other desirable photographic optical system to the camera body. When the photographic optical system is removed from the camera body, the dust floating in the environment of the camera flows into the camera body, possibly adhering to the surface of the image sensor element or to the surface of the transparent member (optical element), such as a lens, cover glass or the like, that is positioned in front of the image sensor element. The camera body contains various mechanisms, such as a shutter and a diaphragm mechanism. As these mechanisms operate, they produce dust, which may adhere to the surface of the image sensor element as well.

Projectors have been put to practical use, too, each configured to enlarge an image displayed by a display element (e.g., CRT or liquid crystal element) and project the image onto a screen so that the enlarged image may be viewed. In such a projector, too, dust may adhere to the surface of the display element or to the surface of the transparent member (optical element), such as a lens, cover glass or the like, that is positioned in front of the display element, and enlarged shadows of the dust particles may inevitably be projected to the screen.

Various types of mechanisms that remove dust from the surface of the image forming element or the transparent member (optical element) that is positioned in front of the image sensor element, provided in such image equipment have been developed.

In an electronic image acquisition apparatus disclosed in, for example, U.S. 2004/0169761 A1, a ring-shaped piezoelectric element (vibrating member) is secured to the circumferential edge of a glass plat shaped like a disc (dust-screening member). When a voltage of a prescribed frequency is applied to the piezoelectric element, the glass plat shaped like a disc undergoes a standing-wave, bending vibration having nodes at the concentric circles around the center of the glass plat shaped like a disc. This vibration removes the dust from the glass disc. The vibration (vibrational mode 1) produced by the voltage of the prescribed frequency is a standing wave having nodes at the concentric circles around the center of the disc. The dust particles at these nodes cannot be removed, because the amplitude of vibration at the nodes is small. In view of this, the glass plat shaped like a disc is vibrated at a different frequency, achieving a standing-wave vibration (vibrational mode 2) that has nodes at concentric circles different from those at which the nodes of vibrational mode 1 are located. Thus, those parts of the glass disc, where the nodes lie in vibrational mode 1, are vibrated at large amplitude.

Jpn. Pat. Appln. KOKAI Publication No. 2007-228246 discloses a rectangular dust-screening member and piezoelectric elements secured to the opposite sides of the dust-screening member, respectively. The piezoelectric elements produce vibration at a predetermined frequency, resonating the dust-screening member. Vibration is thereby achieved in such mode that nodes extend parallel to the sides of the dust-screening member. Further, as in the mechanism of U.S. 2004/0169761 A1, the dust-screening member is made to resonate at a different frequency, accomplishing a standing-wave vibrational mode, in order to change the opposition of nodes. Any one of these vibrational modes achieves bending vibration having nodes extending parallel to the sides of the dust-screening member.

BRIEF SUMMARY OF THE INVENTION

According to a first aspect of the present invention, there is provided a vibrating device comprising:

a dust-screening member which is shaped like a plate as a whole and has at least one side that is symmetric to the X-axis that is a given axis of symmetry;

a vibrating member secured to the dust-screening member and configured to produce, at the dust-screening member, vibration having a vibrational amplitude perpendicular to a surface of the dust-screening member; and a drive unit configured to drive the vibrating member to produce vibration Z (x, y) at the dust-screening member, the vibration being expressed as follows:

$$Z(x,y)=W_{mn}(x,y)\cdot\cos(\gamma)+W_{nm}(x,y)\cdot\sin(\gamma)$$

where Z (x, y) is vibration at a given point P (x, y) on the dust-screening member; m and n are positive integers including 0, indicating the order of natural vibration corresponding to a vibrational mode;

$$W_{mn}(x, y) = \sin\left(n\pi \cdot x + \frac{\pi}{2}\right) \cdot \sin\left(m\pi \cdot y + \frac{\pi}{2}\right);$$

$$W_{nm}(x, y) = \sin\left(m\pi \cdot x + \frac{\pi}{2}\right) \cdot \sin\left(n\pi \cdot y + \frac{\pi}{2}\right); \text{ and}$$

γ is +π/4 or ranges from −π/8 to −π/4; and a ratio between a first bending rigidity along the X-axis of at least the dust-screening member and vibrating member in the section orthogonal to the X-axis at the intersection of the X- and Y-axes, to a second bending rigidity along the Y-axis of at least the dust-screening member and vibrating member in the section orthogonal to the Y-axis at the intersection is 0.4 or more, but less than 1.0, the Y-axis being orthogonal to the X-axis in a virtual rectangle which has the same area as the surface of the dust-screening member, and which has long sides including the one side of the dust-screening member.

According to a second aspect of the present invention, there is provided an image equipment comprising:

an image forming element having an image surface on which an optical image is formed;

a dust-screening member which is shaped like a plate as a whole, has at least one side that is symmetric to the X-axis that is a given axis of symmetry, and has a light-transmitting region at least flaring in a radial direction from the center, facing the image surface and spaced therefrom by a predetermined distance;

a vibrating member configured to produce vibration having an amplitude perpendicular to a surface of the dust-screening member, the vibrating member being provided on the dust-screening member, outside the light-transmitting region through which a light beam forming an optical image on the image surface passes;

a sealing structure for surrounding the image forming element and the dust-screening member, thereby providing a closed space in which the image forming element and the dust-screening member that face each other; and a drive unit configured to drive the vibrating member to produce vibration Z (x, y) at the dust-screening member, the vibration being expressed as follows:

$$Z(x,y)=W_{mn}(x,y)\cdot\cos(\gamma)+W_{nm}(x,y)\cdot\sin(\gamma)$$

where Z (x, y) is vibration at a given point P (x, y) on the dust-screening member; m and n are positive integers including 0, indicating the order of natural vibration corresponding to a vibrational mode;

$$W_{mn}(x, y) = \sin\left(n\pi \cdot x + \frac{\pi}{2}\right) \cdot \sin\left(m\pi \cdot y + \frac{\pi}{2}\right);$$

$$w_{nm}(x, y) = \sin\left(m\pi \cdot x + \frac{\pi}{2}\right) \cdot \sin\left(n\pi \cdot y + \frac{\pi}{2}\right); \text{ and}$$

γ is +π/4 or ranges from −π/8 to −π/4, wherein a ratio between a first bending rigidity along the X-axis of at least the dust-screening member and vibrating member in the section orthogonal to the X-axis at the intersection of the X- and Y-axes, to a second bending rigidity along the Y-axis of at least the dust-screening member and vibrating member in the section orthogonal to the Y-axis at the intersection is 0.4 or more, but less than 1.0, the Y-axis being orthogonal to the X-axis in a virtual rectangle which has the same area as the surface of the dust-screening member, and which has long sides including the one side of the dust-screening member.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram schematically showing an exemplary system configuration, mainly electrical, of a lens-exchangeable, single-lens reflex electronic camera (digital camera) that is a first embodiment of the image equipment according to this invention;

FIG. 3 is an exploded perspective view showing a major component (vibrator) of the dust removal mechanism;

FIG. 4A is a front view of a dust filter, explaining how the dust filter is vibrated;

FIG. 4B is a sectional view of the dust filter, taken along line B-B shown in FIG. 4A;

FIG. 4C is a sectional view of the dust filter, taken along line C-C shown in FIG. 4A;

FIG. 5 is a diagram explaining the length of the long sides and that of the short sides of the dust filter;

FIG. 11 is a diagram showing another configuration the dust filter may have;

FIG. 12 is a diagram showing still another configuration the dust filter may have;

FIG. 16 is a timing chart showing the signals output from the components of the dust filter control circuit;

FIG. 18 is a flowchart showing the operating sequence of "silent vibration" that is a subroutine shown in FIG. 17A;

FIG. 19 is a flowchart showing the operation sequence of the "display process" performed at the same time Step S201 of "silent vibration," i.e. subroutine (FIG. 18), is performed;

FIG. 20 is a flowchart showing the operating sequence of the "display process" performed at the same time Step S203 of "silent vibration," i.e., or subroutine (FIG. 18), is performed;

FIG. 21 is a flowchart showing the operating sequence of the "display process" performed at the same time Step S205 of "silent vibration," i.e., subroutine (FIG. 18), is performed;

DETAILED DESCRIPTION OF THE INVENTION

Figure 2A:
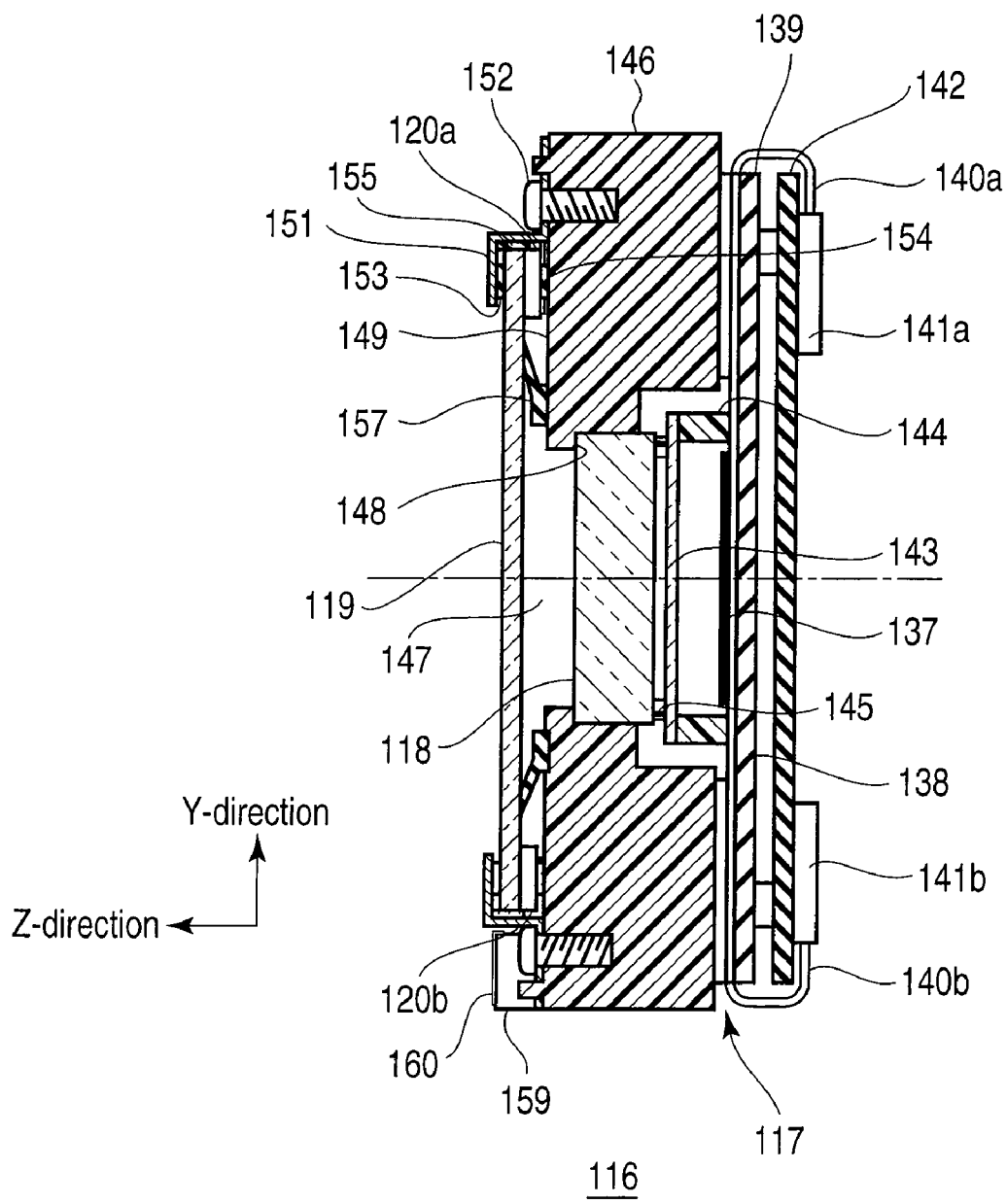
FIG. 2A is a vertical side view of an image sensor element unit of the digital camera, which includes a dust removal mechanism (or a sectional view taken along line A-A shown in FIG. 2B)

Best modes of practicing this invention will be described with reference to the accompanying drawings.

First Embodiment

An image equipment according to this invention, which will be exemplified below in detail, has a dust removal mechanism for the image sensor element unit that performs photoelectric conversion to produce an image signal. Here, a technique of improving the dust removal function of, for example, an electronic camera (hereinafter called "camera" will be explained. The first embodiment will be described, particularly in connection with a lens-exchangeable, single-lens reflex electronic camera (digital camera), with reference to FIGS. 1 to 2B.

First, the system configuration of a digital camera 10 according to this embodiment will be described with reference to FIG. 1. The digital camera 10 has a system configuration that comprises body unit 100 used as camera body, and a lens unit 200 used as an exchange lens, i.e., one of accessory devices.

The lens unit 200 can be attached to and detached from the body unit 100 via a lens mount (not shown) provided on the front of the body unit 100. The control of the lens unit 200 is performed by the lens-control microcomputer (hereinafter called "Lucom") 201 provided in the lens unit 200. The control of the body unit 100 is performed by the body-control microcomputer (hereinafter called "Bucom" 101 provided in the body unit 100. By a communication connector 102, the Lucom 210 and the Bucom 101 are electrically connected to each other, communicating with each other, while the lens unit 200 remains attached to the body unit 100. The Lucom 201 is configured to cooperate, as subordinate unit, with the Bucom 101.

The lens unit 200 further has a photographic lens 202, a diaphragm 203, a lens drive mechanism 204, and a diaphragm drive mechanism 205. The photographic lens 202 is driven by a DC motor (not shown) that is provided in the lens drive mechanism 204. The diaphragm 203 is driven by a stepping motor (not shown) that is provided in the diaphragm drive mechanism 205. The Lucom 201 controls these motors in accordance with the instructions made by the Bucom 101.

In the body unit 100, a penta-prism 103, a screen 104, a quick return mirror 105, an ocular lens 106, a sub-mirror 107, a shutter 108, an AF sensor unit 109, an AF sensor drive circuit 110, a mirror drive mechanism 111, a shutter cocking mechanism 112, a shutter control circuit 113, a photometry sensor 114, and a photometry circuit 115 are arranged as shown in FIG. 1. The penta-prism 103, the screen 104, the quick return mirror 105, the ocular lens 106, and the sub-mirror 107 are single-lens reflex components that constitute an optical system. The shutter 108 is a focal plane shutter arranged on the photographic optical axis. The AF sensor unit 109 receives a light beam reflected by the sub-mirror 107 and detects the degree of defocusing.

The AF sensor drive circuit 110 controls and drives the AF sensor unit 109. The mirror drive mechanism 111 controls and drives the quick return mirror 105. The shutter cocking mechanism 112 biases the spring (not shown) that drives the front curtain and rear curtain of the shutter 108. The shutter control circuit 113 controls the motions of the front curtain and rear curtain of the shutter 108. The photometry sensor 114 detects the light beam coming from the penta-prism 103. The photometry circuit 115 performs a photometry process on the basis of the light beam detected by the photometry sensor 114.

In the body unit 100, an image acquisition unit 116 is further provided to perform photoelectric conversion on the image of an object, which has passed through the above-mentioned optical system. The image acquisition unit 116 is a unit composed of a CCD 117 that is an image sensor element as an image forming element, an optical low-pass filter (LPF) 118 that is arranged in front of the CCD 117, and a dust filter 119 that is a dust-screening member. Thus, in this embodiment, a transparent glass plate (optical element) that has, at least at its transparent part, a refractive index different from that of air is used as the dust filter 119. Nonetheless, the dust filter 119 is not limited to a glass plate (optical element). Any other member (optical element) that exists in the optical path and can transmit light may be used instead. For example, the transparent glass plate (optical element) may be replaced by an optical low-pass filter (LPF), an infrared-beam filter, a deflection filter, a half mirror, or the like. In this case, the frequency and drive time pertaining to vibration and the position of a vibration member (later described) are set in accordance with the member (optical element). The CCD 117 is used as an image sensor element. Nonetheless, any other image sensor element, such as CMOS or the like, may be used instead.

As mentioned above, the dust filter 119 can be selected from various devices including an optical low-pass filter (LPF). However, this embodiment will be described on the assumption that the dust filter is a glass plate (optical element).

To the circumferential edge of the dust filter 119, two piezoelectric elements 120a and 120b and two elastic members 121 (see FIG. 2B) are attached. The piezoelectric elements 120a and 120b have two electrodes each. A dust filter control circuit 122, which is a drive unit, drives the piezoelectric elements 120a and 120b at the frequency determined by the size and material of the dust filter 119. As the piezoelectric elements 120a and 120b vibrate, the dust filter 119 undergoes specific vibration. Dust can thereby be removed from the surface of the dust filter 119. To the image acquisition unit 116, an anti-vibration unit is attached to compensate for the motion of the hand holding the digital camera 10.

The digital camera 10 according to this embodiment further has a CCD interface circuit 123, a liquid crystal monitor 124, an SDRAM 125, a Flash ROM 126, and an image process controller 127, thereby to perform not only an electronic image acquisition function, but also an electronic record/display function. The CCD interface circuit 123 is connected to the CCD 117. The SDRAM 125 and the Flash ROM 126 function as storage areas. The image process controller 127 uses the SDRAM 125 and the Flash ROM 126, to process image data. A recording medium 128 is removably connected by a communication connector (not shown) to the body unit 100 and can therefore communicate with the body unit 100. The recording medium 128 is an external recording medium, such as one of various memory cards or an external HDD, and records the image data acquired by photography. As another storage area, a nonvolatile memory 129, e.g., EEPROM, is provided and can be accessed from the Bucom 101. The nonvolatile memory 129 stores prescribed control parameters that are necessary for the camera control.

To the Bucom 101, there are connected an operation display LCD 130, an operation display LED 131, a camera operation switch 132, and a flash control circuit 132. The operation display LCD 130 and the operation display LED 131 display the operation state of the digital camera 10, informing the user of this operation state. The operation display LED 131 or the operation display LED 131 has, for example, a display unit configured to display the vibration state of the dust filter 119 as long as the dust filter control circuit 122 keeps operating. The camera operation switch 132 is a group of switches including, for example, a release switch, a mode changing switch, a power switch, which are necessary for the user to operate the digital camera 10. The flash control circuit 133 drives a flash tube 134.

In the body unit 100, a battery 135 used as power supply and a power-supply circuit 136 are further provided. The power-supply circuit 136 converts the voltage of the battery 135 to a voltage required in each circuit unit of the digital camera 10 and supplies the converted voltage to the each circuit unit. In the body unit 100, too, a voltage detecting circuit (not shown) is provided, which detects a voltage change at the time when a current is supplied from an external power supply though a jack (not shown).

The components of the digital camera 10 configured as described above operate as will be explained below. The image process controller 127 controls the CCD interface circuit 123 in accordance with the instructions coming from the Bucom 101, whereby image data is acquired from the CCD 117. The image data is converted to a video signal by the image process controller 127. The image represented by the video signal is displayed by the liquid crystal monitor 124. Viewing the image displayed on the liquid crystal monitor 124, the user can confirm the image photographed.

The SDRAM 125 is a memory for temporarily store the image data and is used as a work area in the process of converting the image data. The image data is held in the recording medium 128, for example, after it has been converted to JPEG data.

The mirror drive mechanism 111 is a mechanism that drives the quick return mirror 105 between an up position and a down position. While the quick return mirror 105 stays at the down position, the light beam coming from the photographic lens 202 is split into two beams. One beam is guide to the AF sensor unit 109, and the other beam is guided to the penta-prism 103. The output from the AF sensor provided in the AF sensor unit 109 is transmitted via the AF sensor drive circuit 110 to the Bucom 101. The Bucom 101 performs the distance measuring of the known type. In the meantime, a part of the light beam, which has passed through the penta-prism 103, is guided to the photometry sensor 114 that is connected to the photometry circuit 115. The photometry circuit 115 performs photometry of the known type, on the basis of the amount of light detected by the photometry sensor 114.

The image acquisition unit 116 that includes the CCD 117 will be described with reference to FIGS. 2A and 2B. Note that the hatched parts shown in FIG. 2B show the shapes of members clearly, not to illustrating the sections thereof.

As described above, the image acquisition unit 116 has the CCD 117, the optical LPF 118, the dust filter 119, the piezo-electric elements 120a and 120b, and the elastic members 121. The CCD 117 is an image sensor element that produces an image signal that corresponds to the light applied to its photoelectric conversion surface through the photographic optical system. The optical LPF 118 is arranged at the photoelectric conversion surface of the CCD 117 and removes high-frequency components from the light beam coming from the object through the photographic optical system. The dust filter 119 is a dust-screening member arranged in front of the optical LPF 118 and facing the optical LPF 118, spaced apart therefrom by a predetermined distance. The piezoelectric elements 120a and 120b are arranged on the circumferential edge of the dust filter 119 and are vibrating members for applying specific vibration to the dust filter 119. The elastic members 121 adjust the bending rigidity with respect to the X- and Y-directions, in order to increase the vibrational amplitude of the dust filter 119.

As described above, the piezoelectric elements 120a and 120b are arranged on the edge parts of the dust filter 119. This means that the piezoelectric elements 120a and 120b are fixed to the dust filter 119 with adhesive, or may contact the dust filter 119. If the piezoelectric elements 120a and 120b are fixed to the dust filter 119 with adhesive, the bending rigidity of the vibrating system composed of the piezoelectric elements 120a and 120b and the dust filter 119 will be adjusted. If the piezoelectric elements 120a and 120b contact the dust filter 119, the bending rigidity of only the dust filter 119 will be adjusted.

The CCD chip 137 of the CCD 117 is mounted directly on a flexible substrate 138 that is arranged on a fixed plate 139. From the ends of the flexible substrate 138, connection parts 140a and 140b extend. Connectors 141a and 141b are provided on a main circuit board 142. The connection parts 140a and 140b are connected to the connectors 141a and 141b, whereby the flexible substrate 138 is connected to the main circuit board 142. The CCD 117 has a protection glass plate 143. The protection glass plate 143 is secured to the flexible substrate 138, with a spacer 144 interposed between it and the flexible substrate 138.

Between the CCD 117 and the optical LPF 118, a filter holding member 145 made of elastic material is arranged on the front circumferential edge of the CCD 117, at a position where it does not cover the effective area of the photoelectric conversion surface of the CCD 117. The filter holding member 145 abuts on the optical LPF 118, at a part close to the rear circumferential edge of the optical LPF 118. The filter holding member 145 functions as a sealing member that maintains the junction between the CCD 117 and the optical LPF 118 almost airtight. A holder 146 is provided, covering seals the CCD 117 and the optical LPF 118 in airtight fashion. The holder 146 has a rectangular opening 147 in a part that is substantially central around the photographic optical axis. The inner circumferential edge of the opening 147, which faces the dust filter 119, has a stepped part 147 having an L-shaped cross section. Into the opening 147, the optical LPF 118 and the CCD 117 are fitted from the back. In this case, the front circumferential edge of the optical LPF 118 contacts the stepped part 147 in a virtually airtight fashion. Thus, the optical LPF 118 is held by the stepped part 148 at a specific position in the direction of the photographic optical axis. The optical LPF 118 is therefore prevented from slipping forwards from the holder 146. The level of airtight sealing between the CCD 117 and the optical LPF 118 is sufficient to prevent dust from entering to form an image having shadows of dust particles. In other words, the sealing level need not be so high as to completely prevent the in-flow of gasses.

On the front circumferential edge of the holder 146, a dust-filter holding unit 149 is provided, covering the entire front circumferential edge of the holder 146. The dust-filter holding unit 149 is formed, surrounding the stepped part 148 and projecting forwards from the stepped part 148, in order to hold the dust filter 119 in front of the LPF 118 and to space the filter 119 from the stepped part 148 by a predetermined distance. The opening of the dust-filter holding unit 149 serves as focusing-beam passing area 150. The dust filter 119 is shaped like a polygonal plate as a whole (a square plate, in this embodiment). The dust filter 119 is supported on the dust-filter holding unit 149, pushed onto the dust-filter holding unit 149 by a pushing member 151 which is constituted by an elastic body such as a leaf spring and has one end fastened with screws 152 to the dust-filter holding unit 149. More specifically, a cushion member 153 made of vibration attenuating material, such as rubber or resin, is interposed between the pushing member 151 and the dust filter 119. On the other hand, between the back of the dust filter 119 and the dust-filter holding unit 149, a cushion member 154 is interposed, which is almost symmetric with respect to the photographic optical axis and which is made of vibration-attenuating material such as rubber. The cushion members 153 and 154 hold the dust filter 119, not to impede the vibration of the dust filter 119. The dust filter 119 is positioned with respect to the Y-direction in the plane that is perpendicular to the optical axis, as that part of the pushing member 151 which is bent in the Z-direction, receive a force through a support member 155. On the other hand, the dust filter 119 is positioned with respect to the X-direction in the plane that is perpendicular to the optical axis, as a support part 156 provided on the holder 146 receive a force through the support member 155, as is illustrated in FIG. 2B. The support member 155 is made of vibration-attenuating material such as rubber or resin, too, not to impede the vibration of the dust filter 119. The cushion members 153 and 154 may be located at nodes of the vibration of the dust filter 119, which will be described later. In this case, the vibration of the dust filter 119 will be almost impeded. This can provide an efficient dust removal mechanism that achieves vibration of large amplitude. Between the circumferential edge of the dust filter 119 and the dust-filter holding unit 149, a seal 157 having an annular lip part is arranged, defining an airtight space including an opening 147. The image acquisition unit 116 is thus configured as an airtight structure that has the holder 146 having a desired size and holding the CCD 117. The level of airtight sealing between the dust filter 119 and the dust-filter holding unit 149 is sufficient to prevent dust from entering to form an image having shadows of dust particles. The sealing level need not be so high as to completely prevent the in-flow of gasses.

As described above, the dust filter 119 is supported to the dust-filter holding unit 149 by the pushing member 151 via the cushion members 153 and 154. Nonetheless, the dust filter 119 may be supported by the seal 157, not by the cushion member 154 at least.

To the ends of the piezoelectric elements 120a and 120b, which are vibrating members, flexes 158a and 158b, i.e., flexible printed boards, are electrically connected. The flexes 158a and 158b input an electric signal (later described) from the dust filter control circuit 122 to the piezoelectric elements 120a and 120b, causing the elements 120a and 120b to vibrate in a specific way. The flexes 158a and 158b are made of resin and cupper etc., and have flexibility. Therefore, they little attenuate the vibration of the piezoelectric elements 120a and 120b. The flexes 158a and 158b are provided at positions where the vibrational amplitude is small (at the nodes of vibration, which will be described later), and can therefore suppress the attenuation of vibration. The piezoelectric elements 120a and 120b move relative to the body unit 100 if the camera 10 has such a hand-motion compensating mechanism as will be later described. Hence, if the dust filter control circuit 122 is held by a holding member formed integral with the body unit 100, the flexes 158a and 158b are deformed and displaced as the hand-motion compensating mechanism operates. In this case, the flexes 158a and 158b effectively work because they are thin and flexible. In the present embodiment, the flexes 158a and 158b have a simple configuration, extending from two positions. They are best fit for use in cameras having a hand-motion compensating mechanism.

The dust removed from the surface of the dust filter 119 falls onto the bottom of the body unit 100, by virtue of the vibration inertia and the gravity. In this embodiment, a base 159 is arranged right below the dust filter 119, and a holding member 160 made of, for example, adhesive tape, is provided on the base 159. The holding member 160 reliably traps the dust fallen from the dust filter 119, preventing the dust from moving back to the surface of the dust filter 119. That is, the dust filter 119, which is a dust-screening member, is shaped like a plate and has a focusing-beam passing area 150, i.e., light-transmitting part through which the light beam coming from the object passes. The dust filter 119 is shaped symmetric with respect to one or both of the X- and Y-axes that are two-dimensional virtual axes orthogonal to the axis of the light beam coming from the object. The X-axis 161 is parallel to opposite sides of the CCD 117, and the Y-axis is parallel to the other opposite sides of the CCD 117. The CCD 117 is arranged on the optical axis and spaced apart from the dust filter 119 by a predetermined distance. The CCD 117 converts the light beam coming from the object through the light-transmitting part of the dust filter 119, into an electrical signal. The piezoelectric elements 120a and 120b as the vibrating members are shaped like a plate, and are arranged, respectively, at the outer edges of the two sides of the dust filter 119, which intersect with one of the X- and Y-axes 161 and 162. The piezoelectric elements 120a and 120b and vibrate the dust filter 119 in a specific manner.

The elastic members 121 are arranged, respectively, at the outer edges of the two sides of the dust filter 119, which intersect with the other of the X-axis 161 and Y-axis 162. That is, the elastic members 121 are arranged at the two opposite sides of the dust filter 119, which are other than the sides at which the piezoelectric elements 120a and 120b are arranged.

The hand-motion compensating mechanism will be explained in brief. As shown in FIG. 1, the hand-motion compensating mechanism is composed of an X-axis gyro 163, a Y-axis gyro 164, a vibration control circuit 165, an X-axis actuator 166, a Y-axis actuator 167, an X-frame 168, a Y-frame 169 (holder 146), a frame 170, a position sensor 171, and an actuator drive circuit 172. The X-axis gyro 163 detects the angular velocity of the camera when the camera moves, rotating around the X axis. The Y-axis gyro 164 detects the angular velocity of the camera when the camera rotates around the Y axis. The vibration control circuit 165 calculates a value by which to compensate the hand motion, from the angular-velocity signals output from the X-axis gyro 163 and Y-axis gyro 164. In accordance with the hand-motion compensating value thus calculated, the actuator drive circuit 172 moves the CCD 117 in the X-axis direction and Y-axis direction, which are first and second directions orthogonal to each other in the XY plane that is perpendicular to the photographic optical axis, thereby to compensate the hand motion, if the photographic optical axis is taken as Z axis. More precisely, the X-axis actuator 166 drives the X-frame 168 in the X-axis direction upon receiving a drive signal from the actuator drive circuit 172, and the Y-axis actuator 167 drives the Y-frame 169 in the Y-axis direction upon receiving a drive signal from the actuator drive circuit 172. That is, the X-axis actuator 166 and the Y-axis actuator 167 are used as drive sources, the X-frame 168 and the Y-frame 169 (holder 146) which holds the CCD 117 of the image acquisition unit 116 are used as objects that are moved with respect to the frame 170. Note that the X-axis actuator 166 and the Y-axis actuator 167 are each composed of an electromagnetic motor, a feed screw mechanism, and the like. Alternatively, each actuator may be a linear motor using a voice coil motor, a linear piezoelectric motor or the like. The position sensor 171 detects the position of the X-frame 168 and the position of the Y-frame 169. On the basis of the positions the position sensor 171 have detected, the vibration control circuit 165 controls the actuator drive circuit 172, which drives the X-axis actuator 166 and the Y-axis actuator 167. The position of the CCD 117 is thereby controlled.

The dust removal mechanism of the first embodiment will be described in detail, with reference to FIGS. 3 to 13. The dust filter 119 has at least one side symmetric with respect to a certain symmetry axis, and is a glass plate (optical element) of a polygonal plate as a whole (a square plate, in this embodiment). The dust filter 119 has a region flaring in the radial direction from the center. This region forms a transparent part. Alternatively, the dust filter 119 may be D-shaped, formed by cutting a part of a circular plate, thus defining one side. Still alternatively, it may formed by cutting a square plate, having two opposite sides accurately cut and having upper and lower sides. The above-mentioned fastening mechanism fastens the dust filter 119, with the transparent part opposed to the front of the LPF 118 and spaced from the LPF 118 by a predetermined distance. To one surface of the dust filter 119 (i.e., back of the filter 119, in this embodiment), the piezoelectric elements 120a and 120b, which are vibrating members, are secured at the upper and lower edges of the filter 119, by means of adhesion using adhesive. The piezoelectric elements 120a and 120b, which are arranged on the dust filter 119, constitute a vibrator 173. The vibrator 173 undergoes resonance when a voltage of a prescribed frequency is applied to the piezoelectric elements 120a and 120b. The elastic members 121 are fixed, by adhesion or a similar means, to those sides of the dust filter 119, at which the piezoelectric elements 120a and 120b are not arranged. The elastic members 121 adjust the bending rigidities of the X- and Y-axial parts of the vibrator 173 having the piezoelectric elements 120a and 120b, respectively, which are arranged on the dust filter 119. The elastic members 121 therefore cause the vibrators 173 to vibrate in one of the vibrational modes shown in FIGS. 4A to 4C. The vibrator 173, which has the piezoelectric elements 120a and 120b and the elastic members 121, undergoes resonance when a voltage of the predetermined frequency is applied to the piezoelectric elements 120a and 120b. As a result, the ratio between the bending rigidities the X- and Y-axial parts of the vibrator 173 comes to have a predetermined value. The vibrator 173 therefore generates such a bending vibration of large amplitude as shown in FIGS. 4A to 4C.

As shown in FIG. 3, signal electrodes 174a and 175a are formed on the piezoelectric element 120a, and signal electrodes 174b and 175b are formed on the piezoelectric element 120b. Note that the hatched parts shown in FIG. 3 show the shapes of the signal electrodes clearly, not to illustrating the sections thereof. The signal electrodes 175a and 175b are provided on the back opposing the signal electrodes 174a and 174b, and are bent toward that surface of the piezoelectric element 120a, on which the signal electrodes 174a and 174b are provided. The flex 158a having the above-mentioned conductive pattern is electrically connected to the signal electrode 174a and signal electrode 175a. The flex 158b having the above-mentioned conductive pattern is electrically connected to the signal electrode 174b and signal electrode 175b. To the signal electrodes 174a, 174b, 175a and 175b, a drive voltage of the prescribed frequency is applied form the dust filter control circuit 122 through flexes 158a and 158b. The drive voltage, thus applied, can cause the dust filter 119 to undergo such a two-dimensional, standing-wave bending vibration as is shown in FIGS. 4A to 4C. Those sides of the dust filter 119, at which the piezoelectric elements 120a and 120b are arranged, have length LA. The piezoelectric elements 120a and 120b have length Dx. (This size notation accords with the size notation used in FIG. 5.) Since the dust filter 119 shown in FIG. 4A is rectangular, it is identical in shape to the "virtual rectangle" according to this invention (later described). Hence, the long sides LA of the dust filter 119 are identical to the sides LF of the virtual rectangle that include the sides LA.

The bending rigidity Eix of the X-axial part is expressed as: Eix=Eb×Ib+Ed×Id. Here, Ib is the second moment of area around the neutral axis of a section (i.e., section shown in FIG. 4B) which includes the X-axis 176 (FIG. 4A) and which is perpendicular to the surface of the dust filter 119; Eb is the elastic modulus of the dust filter 119; Id is the second moment of area around the neutral axis of the elastic members 121; and Ed is the elastic modulus of the elastic members 121.

Figure 6:
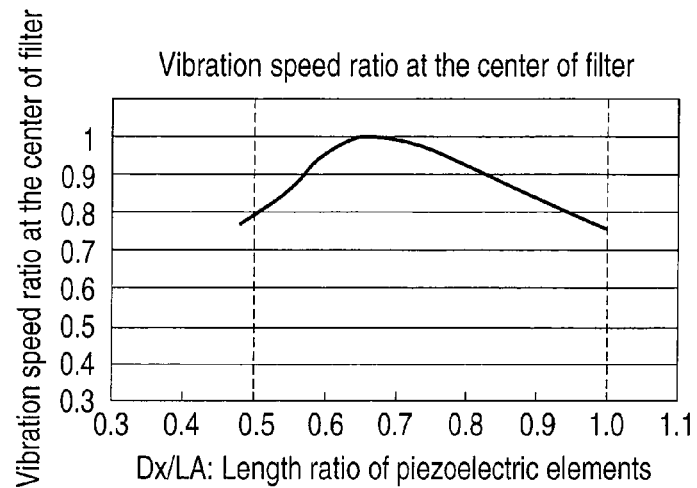
FIG. 6 is a diagram showing the relation the length ratio of piezoelectric elements and the vibration speed ratio of the center part of the dust filter shown in FIG. 4A.

The bending rigidity Eiy of the Y-axial part is expressed as: Eiy=Eb×Ib'+Es×Is. Here, Ib' is the second moment of area around the neutral axis of a section (i.e., section shown in FIG. 4C) which includes the Y-axis 177 (FIG. 4A) and which is perpendicular to the surface of the dust filter 119; Eb is the elastic modulus of the dust filter 119; Is the second moment of area around the neutral axis of the piezoelectric elements 120a and 120b; and Es is the elastic modulus of the piezoelectric elements 120a and 120b. The ratio of the length Dx of the piezoelectric elements 120a and 120b to the length LA the dust filter 119 has in the lengthwise direction of the piezoelectric elements 120a and 120b, i.e., Dx/LA, is 0.5 or more. Similarly, the ratio of the length Cy (in size notation of FIG. 5) of the elastic members 121 to the length LB the dust filter 119 has in the lengthwise direction of the elastic members 121, i.e., Cy/LB, is 0.5 or more. If the bending rigidities are represented by the above-mentioned sections, ratio Dx/LA and ration Cy/LBa will be approximately 0.5 or more because the piezoelectric elements 120a and 120b and the elastic members 121 need to have a certain length each as shown in FIG. 6.

The bending vibration shown in FIG. 4A is standing wave vibration. In FIG. 4A, the blacker the streaks, each indicating a node area 178 of vibration (i.e., area where the vibrational amplitude is small), the smaller the vibrational amplitude is. Note that the meshes shown in FIG. 4A are division meshes usually used in the final element method.

If the node areas 178 are at short intervals as shown in FIG. 4A when the vibration speed is high, in-plane vibration (vibration along the surface) will occur in the node areas 178. This vibration induces a large inertial force in the direction of the in-plane vibration (see mass point Y2 in FIG. 13, described later, which moves over the node along an arc around the node, between positions Y2 and Y2') to the dust at the node areas 178. If the dust filter 119 is inclined to become parallel to the gravity so that a force may act along the dust receiving surface, the inertial force and the gravity can remove the dust from the node areas 178.

In FIG. 4A, the white areas indicate areas where the vibrational amplitude is large. The dust adhering to any white area is removed by the inertial force exerted by the vibration. The dust can be removed from the node areas 178, too, by producing vibration in another mode, at similar amplitude at each node area 178.

Figure 7:
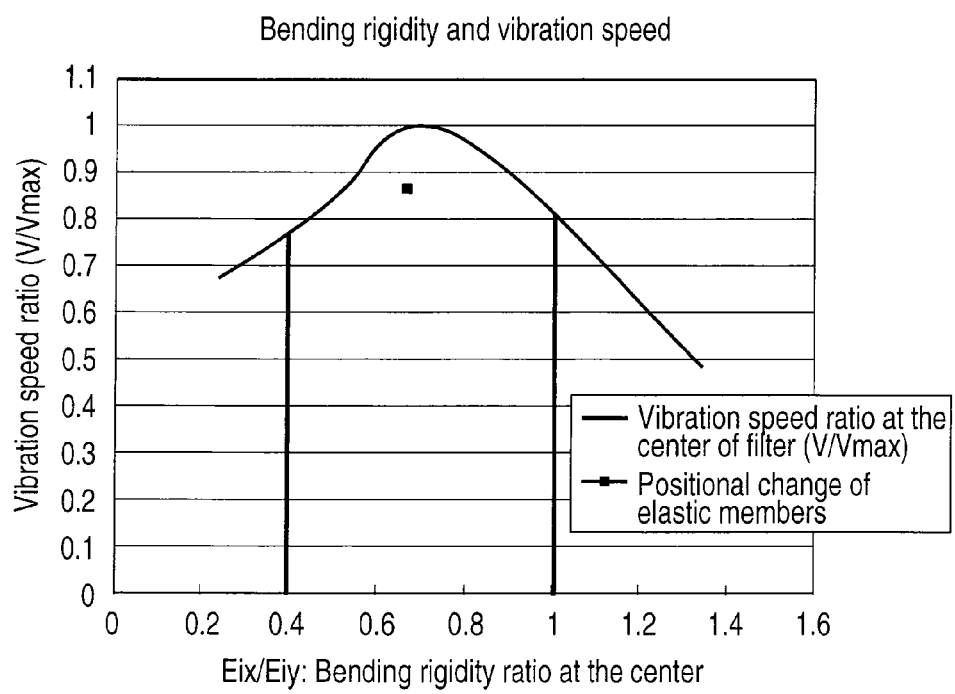
FIG. 7 is a diagram showing the relation the bending rigidity ratio and the vibration speed ratio of the center part of the dust filter shown in FIG. 4A.
Figure 8:
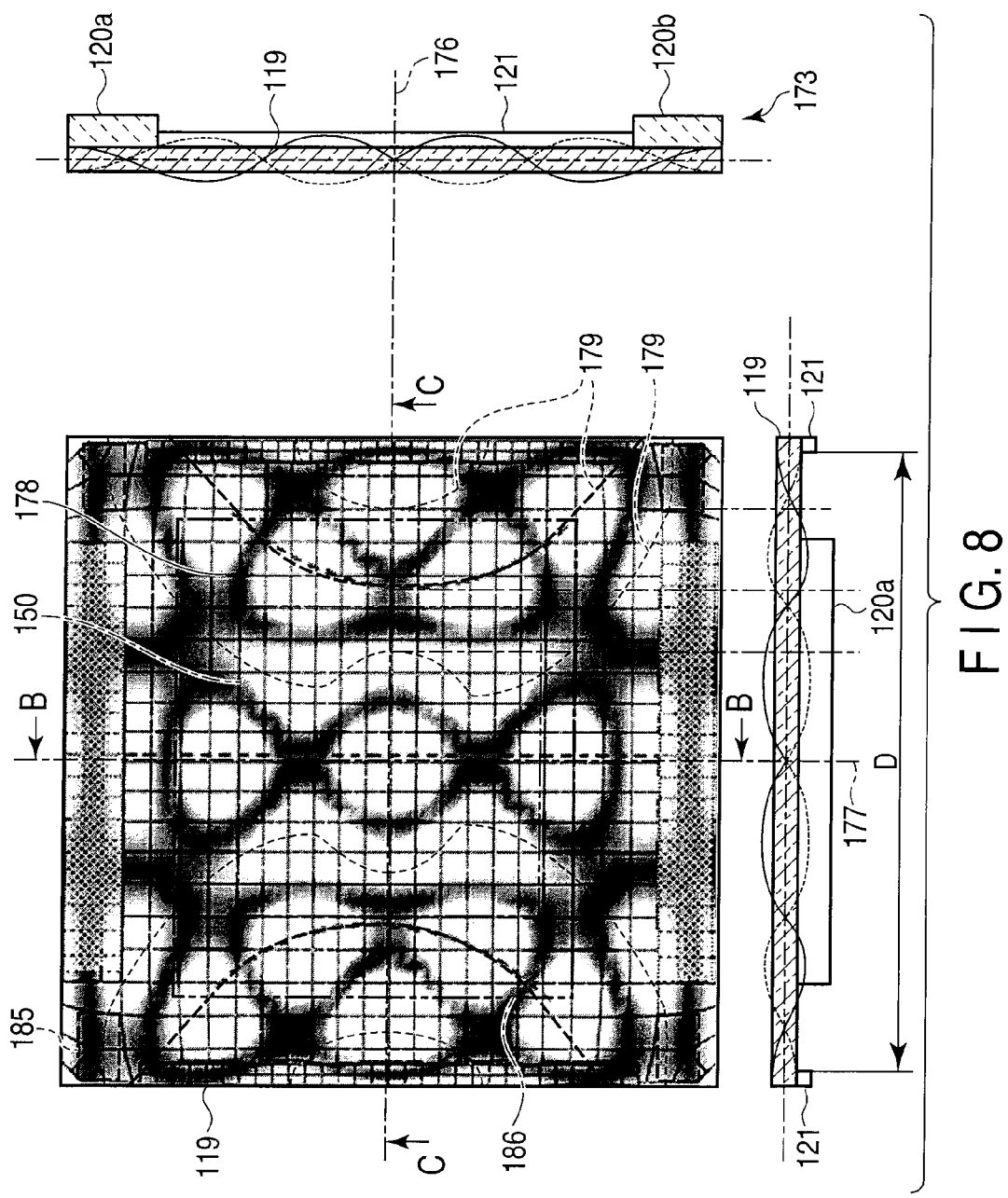
FIG. 8 is a diagram explaining how the dust filter is vibrated in still another mode.

If the bending rigidity ratio Eix/Eiy, which is the ratio of the bending rigidity of the X-axial part of the vibrator 173 to the bending rigidity of the Y-axial part thereof, is changed, the vibration speed ratio (i.e., ratio between the maximum vibration speed and each vibration speed) at the center (x=0, y=0) of the dust filter 119 will change as illustrated in FIG. 7. The bending moment Eix acting in the X-direction is expressed as: Eix=E·Ix/(1−v²), where Ix is the second moment of area in the section of the vibrator, including a reinforcement member passing the intersection of the X- and Y-axes and extending orthogonal to the X-axis, E is Young's modulus of each member, and ν is Poisson's ratio of each member. Further, the bending moment Eiy acting in the Y-direction is expressed as: Eiy=E·Iy/(1−v²), where Iy is the second moment of area in the section of the vibrator, including a reinforcement member passing the intersection of the X- and Y-axes and extending orthogonal to the Y-axis, E is Young's modulus of each member, and ν is Poisson's ratio of each member. In FIG. 7, the square dot (■) pertains to the vibrational mode shown in FIG. 4A. If the vibration ratio is 1, i.e., the peak of the solid curve (FIG. 7), the vibrational mode is such a type as shown in FIG. 8. As seen from FIG. 7, the vibration speed ratio, i.e., the ratio of the vibration speed to the maximum speed, can be 0.7 or more and a desirable vibration speed can be attained if the bending rigidity ratio Eix/Eiy of the vibrator 173 is about 0.4 or more, but less than 1.0. The maximum speed ratio, i.e., 1.0, can be attained if the bending rigidity ratio Eix/Eiy is almost 0.7.

Figure 9:
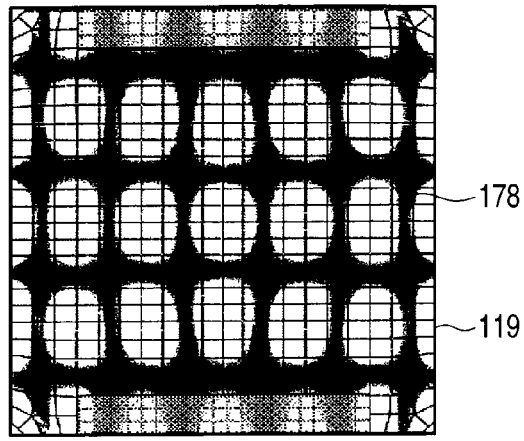
FIG. 9 is a front view of the dust filter vibrated in such a mode that node areas, where vibration hardly occurs, form a lattice pattern.

The graph of FIG. 7 shows the case where the length ratio of either short side of the dust filter 119 to either long side thereof is 0.89. The left end of the solid curve pertains to the case where no elastic members 121 are attached, and shows that the maximum speed can be achieved by attaching the elastic members 121. The vibrational mode at the left end of the solid curve is such a conventional vibrational mode as shown in FIG. 9. That is, even if the length ratio of either short side of the dust filter 119 to either long side thereof does not fall within such a range that optimizes the vibration speed, the vibration speed can be increased merely by arranging the elastic members 121 are arranged on the dust filter 119 so that the bending rigidity ratio between the X- and Y-axes may be a predetermined value.

Figure 10:
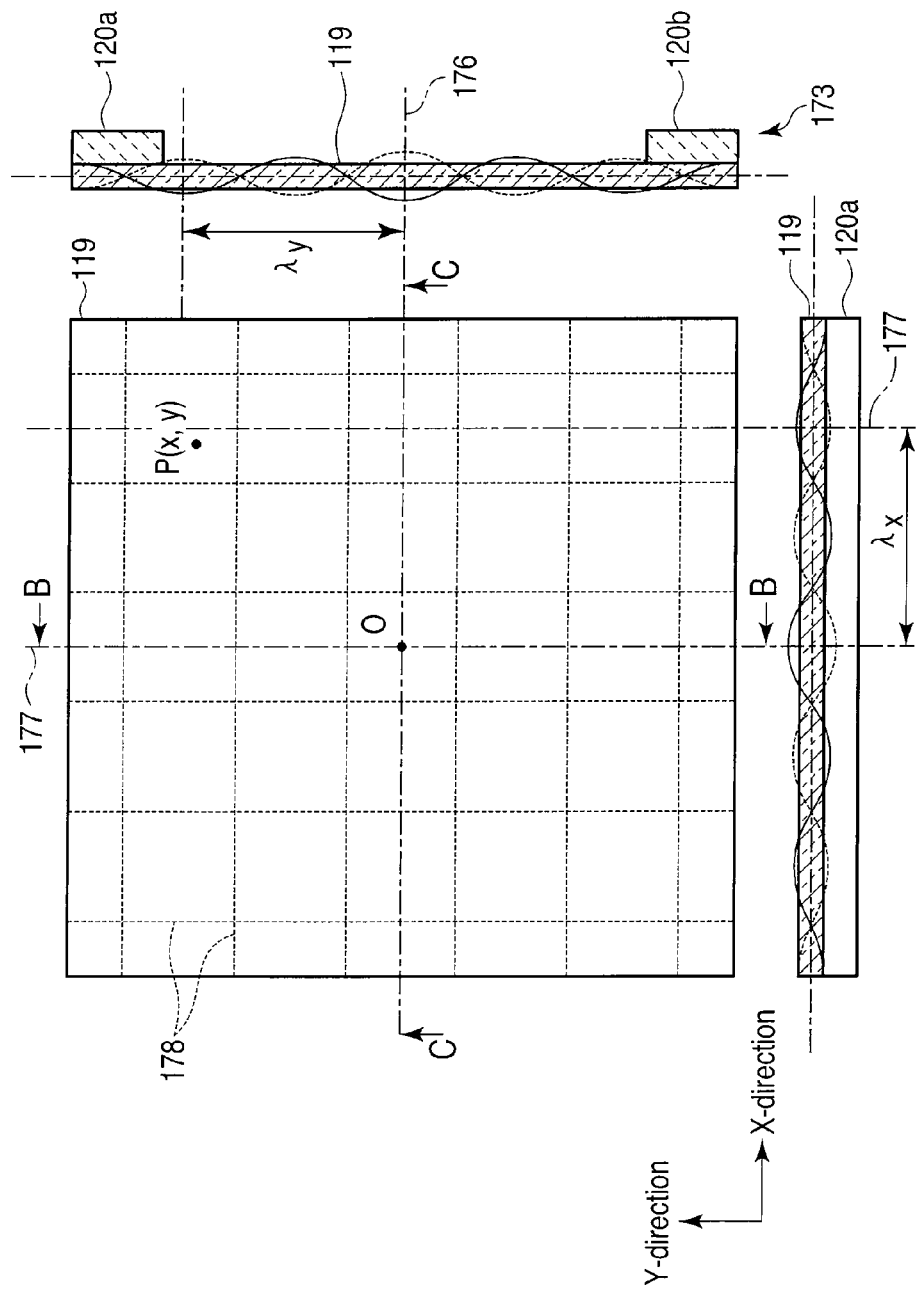
FIG. 10 is a diagram explaining the concept of vibrating the dust filter.

Synthesis of vibrational modes will be explained below. The bending vibrational mode shown in FIG. 4A is achieved by synthesizing the bending vibration of the X-direction and the bending vibration of the Y-direction. The fundamental state of this synthesis is shown in FIG. 10. If the vibrator 173 is put on a member that little attenuates vibration, such as a foamed rubber block, and then made to vibrate freely, a vibrational mode of producing such lattice-shaped node areas 178 as shown in FIG. 9 will be usually attained easily (see Jpn. Pat. Appln. KOKAI Publication No. 2007-228246, identified above). In the front view included in FIG. 10, the broken lines define the node areas 178 shown in FIG. 9 (more precisely, the lines indicate the positions where the vibrational amplitude is minimal in the widthwise direction of lines). In this case, a standing wave, bending vibration at wavelength $\lambda_x$ occurs in the X-direction, and a standing wave, bending vibration at wavelength $\lambda_y$ occurs in the Y-direction. These standing waves are synthesized as shown in FIG. 9. With respect to the origin (x=0, y=0), the vibration Z (x, y) at a given point P (x, y) is expressed by Equation 1, as follows:

$$Z(x,y)=A\cdot W_{mn}(x,y)\cdot\cos(\gamma)+A\cdot W_{nm}(x,y)\cdot\sin(\gamma) \quad (1)$$

where A is amplitude (a fixed value here, but actually changing with the vibrational mode or the power supplied to the piezoelectric elements); m and n are positive integers including 0, indicating the order of natural vibration corresponding to the vibrational mode; γ is a given phase angle;

$$W_{mn}(x, y) = \sin\left(n\pi \cdot x + \frac{\pi}{2}\right)\cdot \sin\left(m\pi \cdot y + \frac{\pi}{2}\right); \text{ and}$$

$$W_{nm}(x, y) = \sin\left(m\pi \cdot x + \frac{\pi}{2}\right)\cdot \sin\left(n\pi \cdot y + \frac{\pi}{2}\right).$$

Assume that the phase angle γ is 0 (γ=0). Then, Equation 1 changes to:

$$Z(x, y) = A \cdot W_{mn}(x, y)$$
$$= A \cdot \sin\left(\frac{n\cdot\pi\cdot x}{\lambda_x} + \frac{\pi}{2}\right)\cdot \sin\left(\frac{m\cdot\pi\cdot y}{\lambda_y} + \frac{\pi}{2}\right).$$

Further assume that $\lambda_x=\lambda_y=\lambda=1$ (x and y are represented by the unit of the wavelength of bending vibration). Then:

$$Z(x, y) = A \cdot W_{mn}(x, y)$$
$$= A \cdot \sin\left(n\cdot\pi\cdot x + \frac{\pi}{2}\right)\cdot \sin\left(m\cdot\pi\cdot y + \frac{\pi}{2}\right).$$

FIG. 9 shows the vibrational mode that is applied if m=n (since the X-direction vibration and the Y-direction vibration are identical in terms of order and wavelength, the dust filter 119 has a square shape). In this vibrational mode, the peaks, nodes and valleys of vibration appear at regular intervals in both the X-direction and the Y-direction, and vibration node areas 178 appear as a checkerboard pattern (conventional vibrational mode). In the vibrational mode where m=0, n=1, the vibration has peaks, nodes and valleys parallel to a side (LB) that extends parallel to the Y-direction. In the vibrational mode identified with a checkerboard pattern or peaks, nodes and valleys parallel to a side, the X-direction vibration and the Y-direction vibration remain independent, never synthesized to increase the vibrational amplitude.

In view of this, the dust filter 119 may be elongated a little, shaped like a rectangle, and may be vibrated at a specific frequency, or in a mode where m=3 and n=2. In this vibrational mode, the phase angle γ is +π/4 or ranges from −π/4 to −π/8. This vibrational mode is a mode in which the present embodiment will have very large vibrational amplitude (the maximum amplitude is at the same level as at the conventional circular dust filter). The phase angle γ can be changed by changing the bending rigidity ratio as in the present embodiment, achieving vibrational modes if γ=+π/4 or γ=−π/4 to −π/8. If the phase angle γ is about +π/4, the vibrational mode will be the mode shown in FIG. 4A. In this vibrational mode, the peak ridges 179 of vibrational amplitude form closed loops around the optical axis though the dust filter 119 is rectangular. Consequently, a reflected wave coming from a side extending in the X-direction and a reflected wave coming from a side extending in the Y-direction are efficiently combined, forming a standing wave. If the phase angle γ is about −π/4, the vibrational mode of FIG. 8 will be realized. In this vibrational mode, peak ridges 179 of vibrational amplitude are formed, surrounding the midpoint of each side. That is, the center of the dust filter 119 becomes a node area 178 where vibrational amplitude is scarcely observed. Peak ridges 179 of vibrational amplitude are formed, surrounding the midpoint of each side. In the vibration of FIG. 4A or FIG. 8, the vibration speed (see FIG. 7) can be increased about 50% over the vibration speed achieved in the conventional vibrational mode (see FIG. 9) wherein the nodes of bending vibration form a lattice pattern.

The dust filter 119 of the vibrator 173, shown in FIG. 4A, is a glass plate (optical element) having a size of 30.8 mm (X-direction: LA, LF)×28.5 mm (Y-direction: LB)×0.65 mm (thickness: T). The dust filter 119 is rectangular, having long sides LA (30.8 mm, extending in the X-direction) and short sides LB (34.5 mm). Therefore, the dust filter 119 is identical to the "virtual rectangle" according to this invention, which has the same area as the dust filter 119. The long sides LA of the dust filter 119 are arranged are thus identical to the sides LF of the virtual rectangle that includes the sides LA. The piezoelectric elements 120a and 120b are made of lead titanate-zirconate ceramic and have a size of 21 mm (X-direction: Dx)×3 mm (Y-direction: Dy)×0.8 mm (thickness: Dz). The piezoelectric elements 120a and 120b are adhered with epoxy-based adhesive to the dust filter 119, extending along the upper and lower sides of the filter 119 (optical element), respectively. More specifically, the piezoelectric elements 120a and 120b extend in the X-direction and arranged symmetric in the left-right direction, with respect to the centerline (the Y-axis 177) of the dust filter 119, which extends in the Y-direction. The elastic members 121 are made of the same material as the dust filter 119. That is, they are glass plates, each having a size of 1 mm (X-direction: Cx)×26 mm (Y-direction: Cy)×1 mm (thickness: Cz). The elastic members 121 are arranged symmetric with respect to the X-axis 176 and the Y-axis 177, and are spaced by distance D in the X-direction, where D=24.8 mm. In this case, the resonance frequency in the vibrational mode of FIG. 4A is in the vicinity of 80 kHz.

The dust filter 119 of the vibrator 173, shown in FIG. 8, is a glass plate (optical element) having a size of 30.8 mm (X-direction: LA, LF)×34.5 mm (Y-direction: LB)×0.65 mm (thickness: T). The dust filter 119 is rectangular, having long sides LA (30.8 mm, extending in the X-direction) and short sides LB (34.5 mm). Therefore, the dust filter 119 is identical to the "virtual rectangle" according to this invention, which has the same area as the dust filter 119. The long sides LA of the dust filter 119 are arranged are thus identical to the sides LF of the virtual rectangle that includes the sides LA. The piezoelectric elements 120a and 120b are made of lead titanate-zirconate ceramic and have a size of 21 mm (X-direction: Dx)×3 mm (Y-direction: Dy)×0.8 mm (thickness: Dz). The piezoelectric elements 120a and 120b are adhered with epoxy-based adhesive to the dust filter 119, extending along the upper and lower sides of the filter 119 (optical element), respectively. More specifically, the piezoelectric elements 120a and 120b extend in the X-direction and arranged symmetric in the left-right direction, with respect to the centerline (the Y-axis 177) of the dust filter 119, which extends in the Y-direction. The elastic members 121 are made of the same material as the dust filter 119. That is, they are glass plates, each having a size of 1 mm (X-direction: Cx)×26 mm (Y-direction: Cy)×1 mm (thickness: Cz). The elastic members 121 are arranged symmetric with respect to the X-axis 176 and the Y-axis 177, and are spaced by distance D in the X-direction, where D=28.8 mm. In this case, the resonance frequency in the vibrational mode of FIG. 8 is in the vicinity of 92 kHz. That is, the vibrational mode can be changed from the mode of FIG. 4A to the mode of FIG. 8 if the elastic members 121 are adjusted in position and the phase angle γ is thereby changed. In the vibrational mode of FIG. 8, peak ridges 179 of vibrational amplitude are formed, surrounding the midpoints of the sides that are parallel to the Y-axis 177. In this case, the phase angle γ of bending vibration is about −π/4, at which the vibration speed is high.

FIG. 11 shows a modification of the vibrator 173. The modified vibrator 173 has a dust filter 119 that is D-shaped, formed by cutting a part of a plate shaped like a disc, thus defining one side. That is, the modified vibrator 173 uses a D-shaped dust filter 119 that has a side symmetric with respect to the symmetry axis (the Y-axis 177) extending in the Y-direction. The piezoelectric element 120a is arranged on the surface of the dust filter 119, extending parallel to that side and positioned symmetric with respect to the midpoint of the side (or to a symmetry axis (the Y-axis 177) extending in the Y-direction). On the other hand, the piezoelectric element 120b is substantially inscribed in the outer circumference of the dust filter 119 and extends parallel to that side of the dust filter 119. The elastic members 121, which are shaped like an arc, are arranged symmetric with respect to the Y-axis 177, each extending along the circumference of the dust filter 119. So shaped, the dust filter 119 is more symmetric with respect to its center (regarded as the centroid), and can more readily vibrate in a state desirable to the present embodiment. In addition, the dust filter 119 can be smaller than the circular one. Furthermore, since the piezoelectric elements 120a and 120b are arranged, each parallel to those sides of the dust filter 119, which have notches, the asymmetry in terms vibration, resulting from the cutting, can be made more symmetric by increasing the rigidity. This helps to render the vibration state more desirable. Further, this increases the area in which the elastic members 121 are arranged to adjust the rigidity. The rigidity can therefore be adjusted more than otherwise. Note that the long side and short side shown in FIG. 11 are the long and short sides of a virtual rectangle 180 which has the same area as the dust filter 119, one side of which includes the above-mentioned one side of the dust filter 119, and the opposite side of which extends along an outer side of the piezoelectric element 120b.

FIG. 12 shows another modification of the vibrator 173. This modified vibrator 173 has a dust filter 119 is formed by cutting a circular plate along two parallel lines, forming two parallel sides. That is, the modified vibrator 173 uses a dust filter 119 that has two sides symmetric with respect to the symmetry axis (the Y-axis 177) extending in the Y-direction. In this case, actuate piezoelectric elements 120a and 120b are arranged not on the straight sides, but on the curved parts defining a circle. The elastic members 121 for adjusting the rigidity are arranged symmetry with respect to the X-axis 176 and the Y-axis 177, extending along the symmetric sides. Since the dust filter 119 is so shaped, the piezoelectric elements 120a and 120b are arranged, efficiently providing a smaller vibrator 173. Note that the long side and shot side shown in FIG. 12 are the long and short sides of a virtual rectangle 180 which has the same area as the dust filter 119, two opposite sides of which extend along the opposite two sides of the dust filter 119, respectively. The piezoelectric elements 120a and 120b are arranged at the short sides. The piezoelectric elements 120a and 120b have length Dx as measured along the short sides (having length LB) of the virtual rectangle 177.

Figure 13:
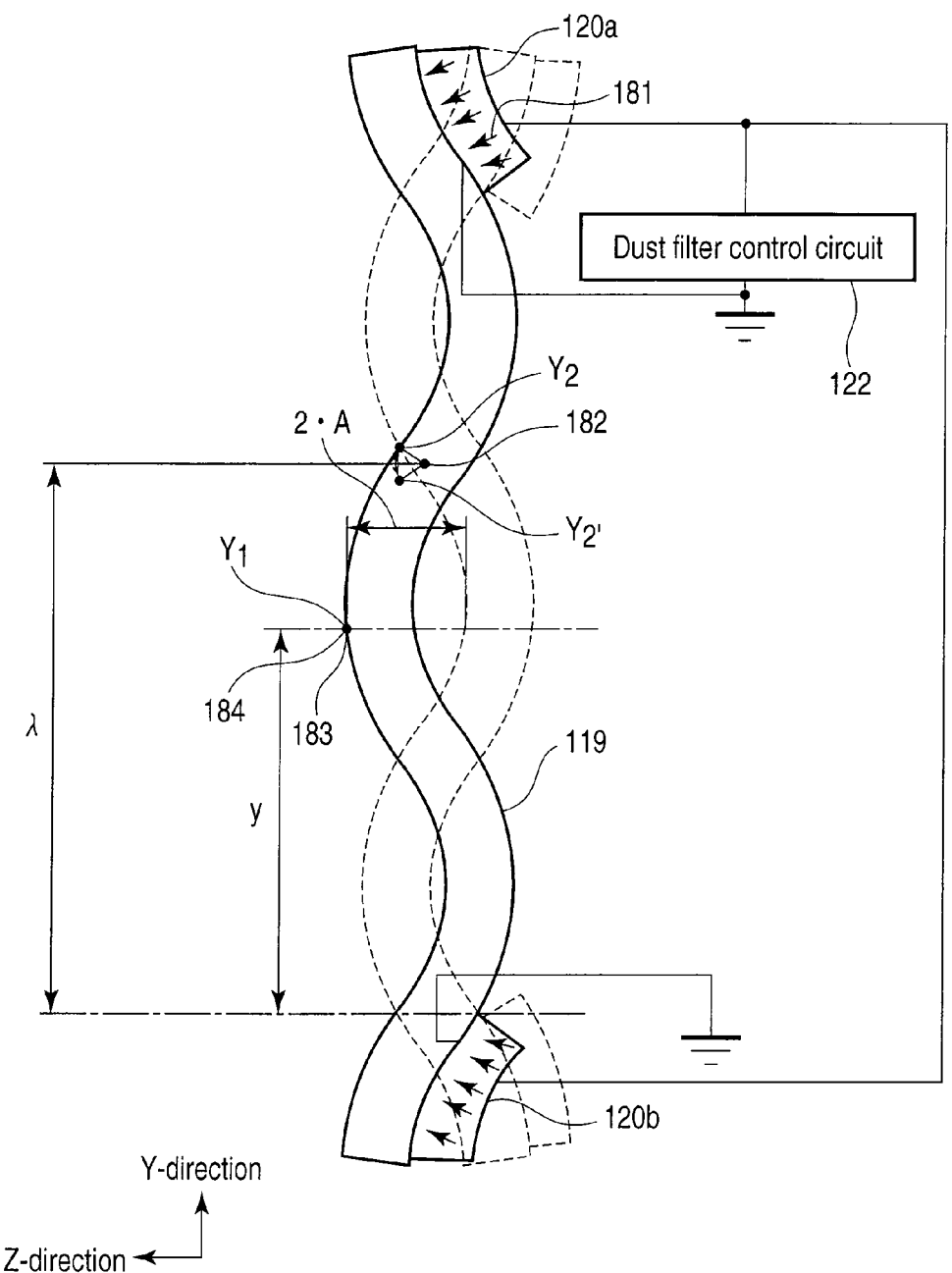
FIG. 13 is a conceptual diagram of the dust filter, explaining the standing wave that is produced in the dust filter.

A method of removing dust will be explained in detail, with reference to FIG. 13. FIG. 13 shows a cross section identical to that shown in FIG. 4B. Assume that the piezoelectric elements 120a and 120b are polarized in the direction of arrow

181 as shown in FIG. 13. If a voltage of a specific frequency is applied to the piezoelectric elements 120*a* and 120*b* at a certain time $t_0$, the vibrator 173 will be deformed as indicated by solid lines. At the mass point Y existing at given position y in the surface of the vibrator 173, the vibration z in the Z-direction is expressed by Equation 2, as follows:

$$z = A \cdot \sin(Y) \cdot \cos(\omega t) \quad (2)$$

where ω is the angular velocity of vibration, A is the amplitude of vibration in the Z-direction, and Y=2 πy/λ (λ: wavelength of bending vibration).

The Equation 2 represents the standing-wave vibration shown in FIG. 4A. Thus, if y=s·λ/2 (here, is an integer), then Y=sπ, and sin(Y)=0. Hence, a node 182, at which the amplitude of vibration in the Z-direction is zero irrespective of time, exists for every π/2. This is standing-wave vibration. The state indicated by broken lines in FIG. 13 takes place if t=kπ/ω (k is odd), where the vibration assumes a phase opposite to the phase at time $t_0$.

Vibration $z(Y_1)$ at point $Y_1$ on the dust filter 119 is located at an antinode 183 of standing wave, bending vibration. Hence, the vibration in the Z-direction has amplitude A, as expressed in Equation 3, as follows:

$$z(Y_1) = A \cdot \cos(\omega t) \quad (3)$$

If Equation 3 is differentiated with time, the vibration speed $Vz(Y_1)$ at point $Y_1$ is expressed by Equation 4, below, because ω=2πf, where f is the frequency of vibration:

$$Vz(Y_1) = \frac{d(z(Y_1))}{dt} = -2\pi f \cdot A \cdot \sin(\omega t) \quad (4)$$

If Equation 4 is differentiated with time, vibration acceleration $\alpha z(Y_1)$ is expressed by Equation 5, as follows:

$$\alpha z(Y_1) = \frac{d(Vz(Y_1))}{dt} = -4\pi^2 f^2 \cdot A \cdot \cos(\omega t) \quad (5)$$

Therefore, the dust 184 adhering at point $Y_1$ receives the acceleration of Equation 5. The inertial force Fk the dust 184 receives at this time is given by Equation 6, as follows:

$$Fk = \alpha z(Y_1) \cdot M = -4\pi^2 f^2 \cdot A \cdot \cos(\omega t) \cdot M \quad (6)$$

where M is the mass of the dust 184.

As can be seen from Equation 6, the inertial force Fk increases as frequency f is raised, in proportion to the square of f. However, the inertial force cannot be increased if amplitude A is small, no matter how much frequency f is raised. Generally, kinetic energy of vibration can be produced, but in a limited value, if the piezoelectric elements 120*a* and 120*b* that produce the kinetic energy have the same size. Therefore, if the frequency is raise in the same vibrational mode, vibrational amplitude A will change in inverse proportion to the square of frequency f. Even if the resonance frequency is raised to achieve a higher-order resonance mode, the vibrational frequency will fall, not increasing the vibration speed or the vibration acceleration. Rather, if the frequency is raised, ideal resonance will hardly be accomplished, and the loss of vibrational energy will increase, inevitably decreasing the vibration acceleration. That is, the mode cannot attain large amplitude if the vibration is produced in a resonance mode that uses high frequency only. The dust removal efficiency will be much impaired.

Although the dust filter 119 is rectangular, the peak ridges 179 of vibrational amplitude form closed loops around the optical axis in the vibrational mode of the embodiment, which is shown in FIG. 4A. In the vibrational mode of the embodiment, which is shown in FIG. 8, the peak ridges 179 of vibrational amplitude form curves surrounding the midpoint of each side. The wave reflected from the side extending in the X-direction and the wave reflected from the side extending in the Y-direction are efficiently synthesized, forming a standing wave.

The vibration speed at the center position of the dust filter 119, as measured in the Z-direction, provides the widest possible region when the length ratio Dx/LA of the piezoelectric elements is set at a value less than 1 (i.e., by making the length LP of the piezoelectric elements 120*a* and 120*b* equal to that of the sides of the dust filter 119), not at 1. This is obvious from FIG. 6, in which the length ratio Dx/LA of the piezoelectric elements 120*a* and 120*b* is plotted against the abscissa (LA (or LF): the length of the dust filter 119 (or that of the virtual rectangle) having a side on which the piezoelectric elements 120*a* and 120*b* are arranged; Dx: the length of the piezoelectric elements 120*a* and 120*b* arranged in parallel to length LA), and the vibration speed ratio at the center of the filter is plotted against the ordinate. In FIG. 6, the ratio ($V/V_{max}$) of the vibration speed V to the maximum vibration speed $V_{max}$ possible in this region is plotted on the ordinate. The maximum value of the length ratio of the piezoelectric elements is, of course, 1. If the length ratio of the piezoelectric elements is 0.5 or less, the vibration speed ratio will be less than 0.8. This means that the speed is lower than the maximum value by 20% or more. Hence, it is preferable for the length ratio of the piezoelectric elements to be 0.5 or more, but less than 1, in order to increase the vibration speed at the center of the dust filter 119, with respect to the Z-direction (to 0.7 or more).

On the circular dust filter, all lines extending from its circumference to its center have the same length. Hence, the waves reflected from the circumference can be synthesized at the highest efficiency. The vibrational amplitude, which is perpendicular to the surface of the circular dust filter, can be extremely large. The vibrational amplitude is actually very large. In vibration wherein the peak ridges 179 of vibrational amplitude form closed loops around the optical axis or the peak ridges 179 form curves surrounding the midpoint of each side according to this embodiment, the dust filter 119 can undergo vibration of amplitude a similar to that of concentric vibration that may occur if the dust filter 119 has a disc shape. In any vibrational mode in which the amplitude is simply parallel to the side (see FIG. 9), the vibration acceleration is only 10% or more of the acceleration achieved in this embodiment.

In the vibration wherein the peak ridges 179 of vibrational amplitude form closed loops or curves surrounding the midpoint of each side, the vibrational amplitude is the largest at the center of the vibrator 173 and small at the closed loop or the curve at circumferential edges. Thus, the dust removal capability is maximal at the center of the image. If the center of the vibrator 173 is aligned with the optical axis, the shadow of dust 184 will not appear in the center part of the image, which has high image quality. This is an advantage.

In the vibration node areas 178, which exist in the focusing-beam passing area, the nodes 182 may be changed in position by changing the drive frequencies of the piezoelectric elements 120*a* and 120*b*. Then, the elements 120*a* and 120*b* resonate in a different vibrational mode, whereby the dust can be removed, of course.

Figure 14A:
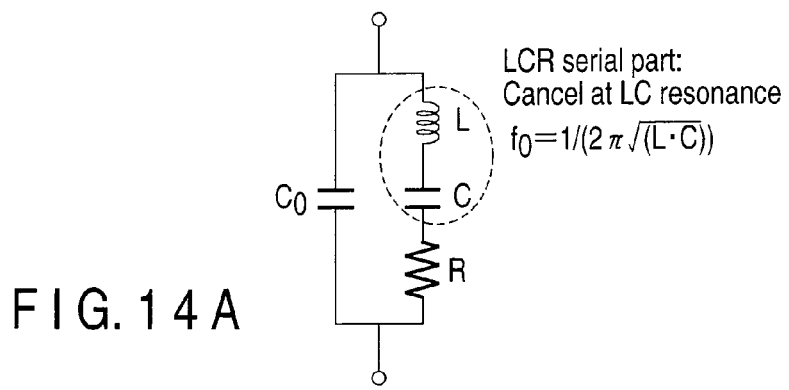
FIG. 14A is a diagram showing an electric equivalent circuit that drives the vibrator at a frequency near the resonance frequency.

A vibration state that is attained if the piezoelectric elements 120a and 120b are driven at a frequency near the resonance frequency will be described with reference to FIGS. 14A and 14B. FIG. 14A shows an equivalent circuit that drives the piezoelectric elements 120a and 120b at a frequency near the resonance frequency. In FIG. 14A, $C_0$ is the electrostatic capacitance attained as long as the piezoelectric elements 120a and 120b remain connected in parallel, and L, C and R are the values of a coil, capacitor and resistor that constitute an electric circuit equivalent to the mechanical vibration of the vibrator 173. Naturally, these values change with the frequency.

Figure 14B:
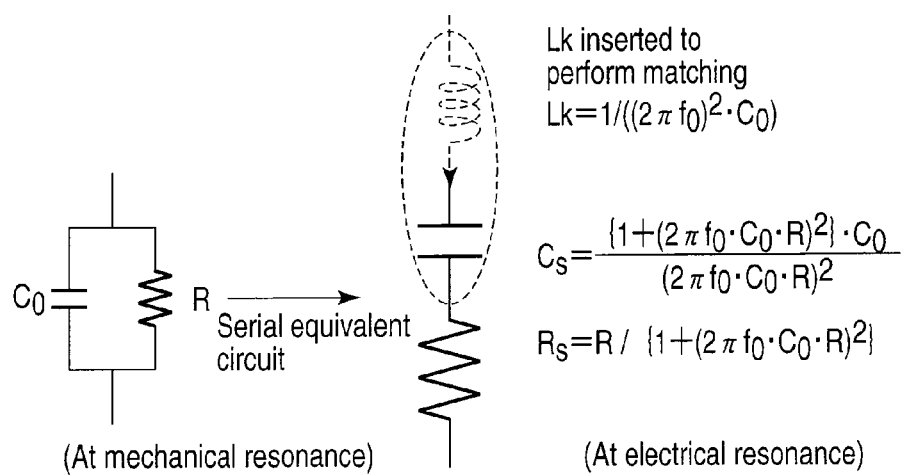
FIG. 14B is a diagram showing an electric equivalent circuit that drives the vibrator at the resonance frequency.

When the frequency changes to resonance frequency $f_0$, L and C achieve resonance as is illustrated in FIG. 14B. As the frequency is gradually raised toward the resonance frequency from the value at which no resonance takes place, the vibration phase of the vibrator 173 changes with respect to the phase of vibration of the piezoelectric elements 120a and 120b. When the resonance starts, the phase reaches π/2. As the frequency is further raised, the phase reaches n. If the frequency is raised even further, the phase starts decreasing. When the frequency comes out of the resonance region, the phase becomes equal to the phase where no resonance undergoes at low frequencies. In the actual situation, however, the vibration state does not become ideal. The phase does not change to π in some cases. Nonetheless, the drive frequency can be set to the resonance frequency.

Support areas 185 existing at the four corners, as shown in FIGS. 4A and 8, are areas in which virtually no vibration takes place. Therefore, these parts are pushed in the Z-direction, holding the dust filter 119 through the cushion members 153 and 154 made of vibration-attenuating material such as rubber. So held, the dust filter 119 can be reliably supported without attenuating the vibration. In other words, the cushion members 153 and 154 made of rubber or the like scarcely attenuate the in-plane vibration, because they allow the dust filter 119 to vibrate in plane.

On the other hand, the seal 157 must be provided in the area having vibrational amplitude, too. In the vibrational mode of the present invention, the peripheral vibrational amplitude is small. In view of this, the dust filter 119 is supported, at circumferential edge, by the lip-shaped part of the seal 157, thereby applying no large force in the direction of bending vibrational amplitude. Therefore, the seal 157 attenuates, but very little, the vibration whose amplitude is inherently small. As shown in FIGS. 4A and 8, as many seal-contact parts 186 as possible contact the node areas 178 in which the vibrational amplitude is small. This further reduces the attenuation of vibration.

The prescribed frequency at which to vibrate the piezoelectric elements 120a and 120b is determined by the shape, dimensions, material and supported state of the dust filter 119, which is one component of the vibrator 173. In most cases, the temperature influences the elasticity coefficient of the vibrator 173 and is one of the factors that change the natural frequency of the vibrator 173. Therefore, it is desirable to measure the temperature of the vibrator 173 and to consider the change in the natural frequency of the vibrator 173, before the vibrator 173 is used. A temperature sensor (not shown) is therefore connected to a temperature measuring circuit (not shown), in the digital camera 10. The value by which to correct the vibrational frequency of the vibrator 173 in accordance with the temperature detected by the temperature sensor is stored in the nonvolatile memory 129. Then, the measured temperature and the correction value are read into the Bucom 101. The Bucom 101 calculates a drive frequency, which is used as drive frequency of the dust filter control circuit 122. Thus, vibration can be produced, which is efficient with respect to temperature changes, as well.

Figure 15:
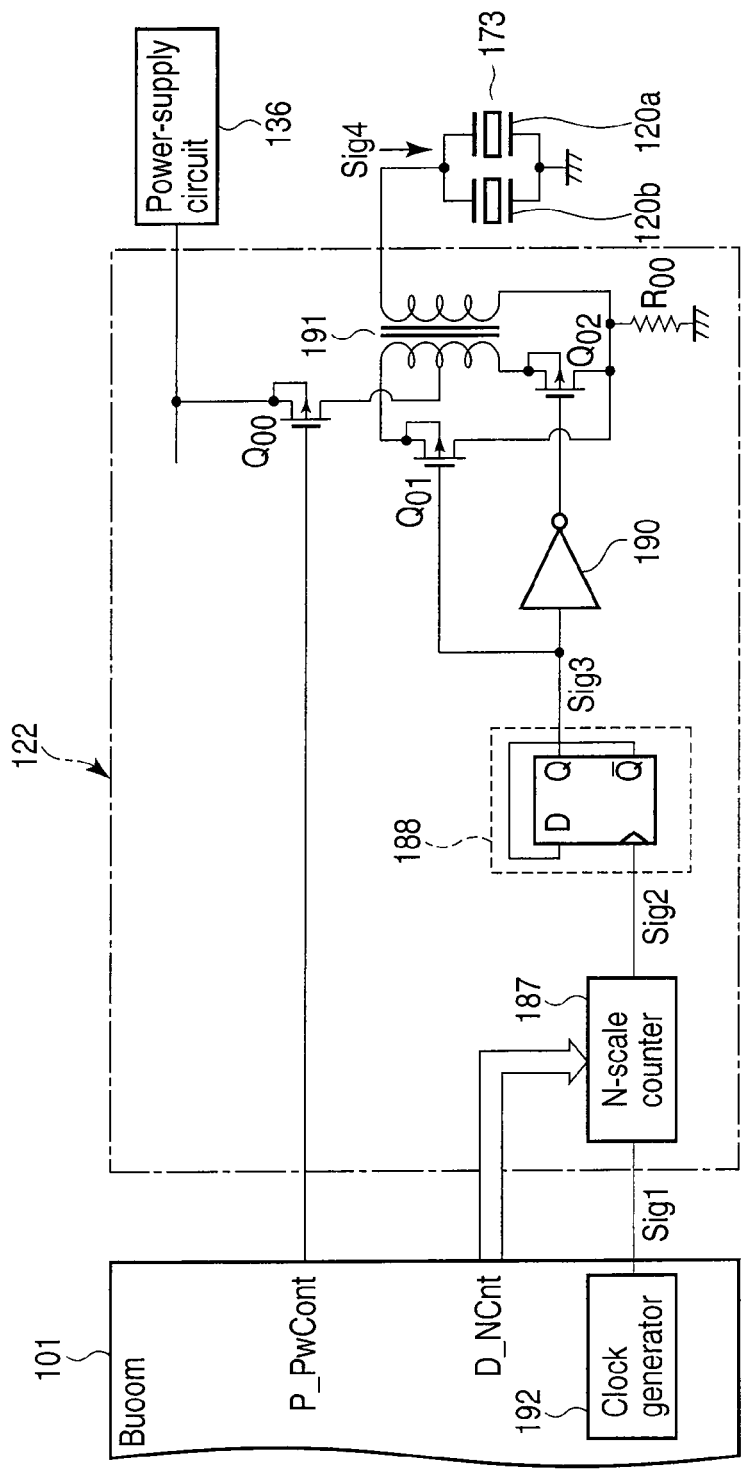
FIG. 15 is a circuit diagram schematically showing the configuration of a dust filter control circuit.

The dust filter control circuit 122 of the digital camera 10 according to this invention will be described below, with reference to FIGS. 15 and 16. The dust filter control circuit 122 has such a configuration as shown in FIG. 15. The components of the dust filter control circuit 122 produce signals (Sig1 to Sig4) of such waveforms as shown in the timing chart of FIG. 16. These signals will control the dust filter 119, as will be described below.

More specifically, as shown in FIG. 15, the dust filter control circuit 122 comprises a N-scale counter 187, a half-frequency dividing circuit 188, an inverter 190, a plurality of MOS transistors $Q_{00}$, $Q_{01}$ and $Q_{02}$, a transformer 191, and a resistor $R_{00}$.

The dust filter control circuit 122 is so configured that a signal (Sig4) of the prescribed frequency is produced at the secondary winding of the transformer 191 when MOS transistors $Q_{01}$ and $Q_{02}$ connected to the primary winding of the transformer 191 are turned on and off. The signal of the prescribed frequency drives the piezoelectric elements 120a and 120b, thereby causing the vibrator 173, to which the dust filter 119 is secured, to produce a resonance standing wave.

The Bucom 101 has two output ports P_PwCont and D_NCnt provided as control ports, and a clock generator 192. The output ports P_PwCont and D_NCnt and the clock generator 192 cooperate to control the dust filter control circuit 122 as follows. The clock generator 192 outputs a pulse signal (basic clock signal) having a frequency much higher than the frequency of the signal that will be supplied to the piezoelectric elements 120a and 120b. This output signal is signal Sig1 that has the waveform shown in the timing chart of FIG. 16. The basic clock signal is input to the N-scale counter 187.

The N-scale counter 187 counts the pulses of the pulse signal. Every time the count reaches a prescribed value "N," the N-scale counter 187 produces a count-end pulse signal. Thus, the basic clock signal is frequency-divided by N. The signal the N-scale counter 187 outputs is signal Sig2 that has the waveform shown in the timing chart of FIG. 16.

The pulse signal produced by means of frequency division does not have a duty ratio of 1:1. The pulse signal is supplied to the half-frequency dividing circuit 188. The half-frequency dividing circuit 188 changes the duty ratio of the pulse signal to 1:1. The pulse signal, thus changed in terms of duty ratio, corresponds to signal Sig3 that has the waveform shown in the timing chart of FIG. 16.

While the pulse signal, thus changed in duty ratio, is high, MOS transistor $Q_{01}$ to which this signal has been input is turned on. In the meantime, the pulse signal is supplied via the inverter 190 to MOS transistor $Q_{02}$. Therefore, while the pulse signal (signal Sig3) is low state, MOS transistor $Q_{02}$ to which this signal has been input is turned on. Thus, the transistors $Q_{01}$ and $Q_{02}$, both connected to the primary winding of the transformer 191, are alternately turned on. As a result, a signal Sig4 of such frequency as shown in FIG. 16 is produced in the secondary winding of the transformer 191.

The winding ratio of the transformer 191 is determined by the output voltage of the power-supply circuit 136 and the voltage needed to drive the piezoelectric elements 120a and 120b. Note that the resistor $R_{00}$ is provided to prevent an excessive current from flowing in the transformer 191.

In order to drive the piezoelectric elements 120a and 120b, MOS transistor $Q_{00}$ must be on, and a voltage must be applied from the power-supply circuit 136 to the center tap of the transformer 191. In this case, MOS transistor $Q_{00}$ is turned on or off via the output port P_PwCont of the Bucom 101. Value "N" can be set to the N-scale counter 187 from the output port D_NCnt of the Bucom 101. Thus, the Bucom 101 can change the drive frequency for the piezoelectric elements 120a and 120b, by appropriately controlling value "N."

The frequency can be calculated by using Equation 7, as follows:

$$fdrv = \frac{fpls}{2N} \qquad (7)$$

where N is the value set to the N-scale counter 187, fpls is the frequency of the pulse output from the clock generator 192, and fdrv is the frequency of the signal supplied to the piezoelectric elements 120a and 120b.

The calculation based on Equation 7 is performed by the CPU (control unit) of the Bucom 101.

If the dust filter 119 is vibrated at a frequency in the ultrasonic region (i.e., 20 kHz or more), the operating state of the dust filter 119 cannot be aurally discriminated, because most people cannot hear sound falling outside the range of about 20 to 20,000 Hz. This is why the operation display LCD 130 or the operation display LED 131 has a display unit for showing how the dust filter 119 is operating, to the operator of the digital camera 10. More precisely, in the digital camera 10, the vibrating members (piezoelectric elements 120a and 120b) imparts vibration to the dust-screening member (dust filter 119) that is arranged in front of the CCD 117, can be vibrated and can transmit light. In the digital camera 10, the display unit is operated in interlock with the vibrating member drive circuit (i.e., dust filter control circuit 122), thus informing how the dust filter 119 is operating (later described in detail).

Figure 17A:
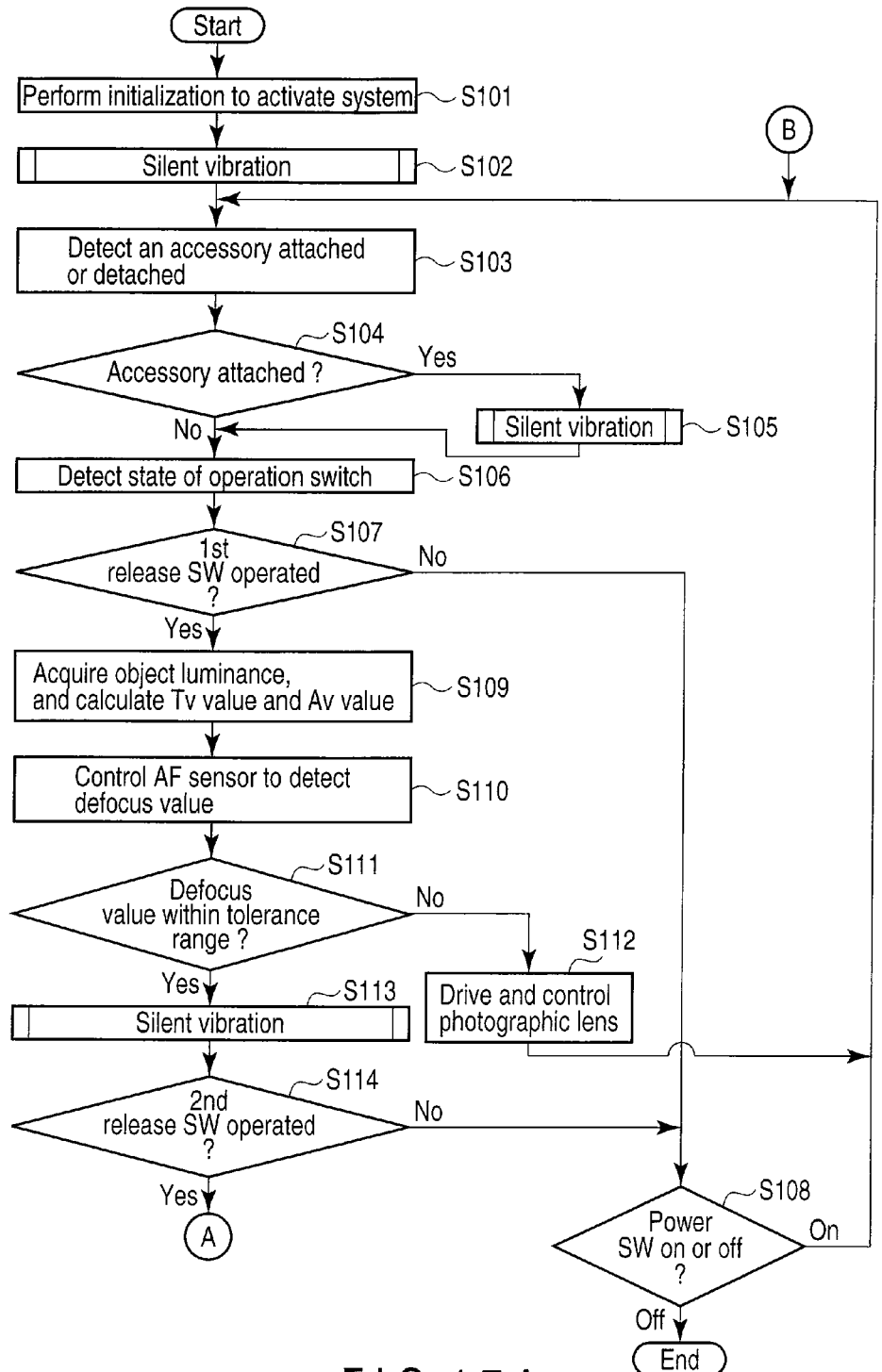
FIG. 17A is the first part of a flowchart showing an exemplary camera sequence (main routine) performed by the microcomputer for controlling the digital camera body according to the first embodiment.
Figure 17B:
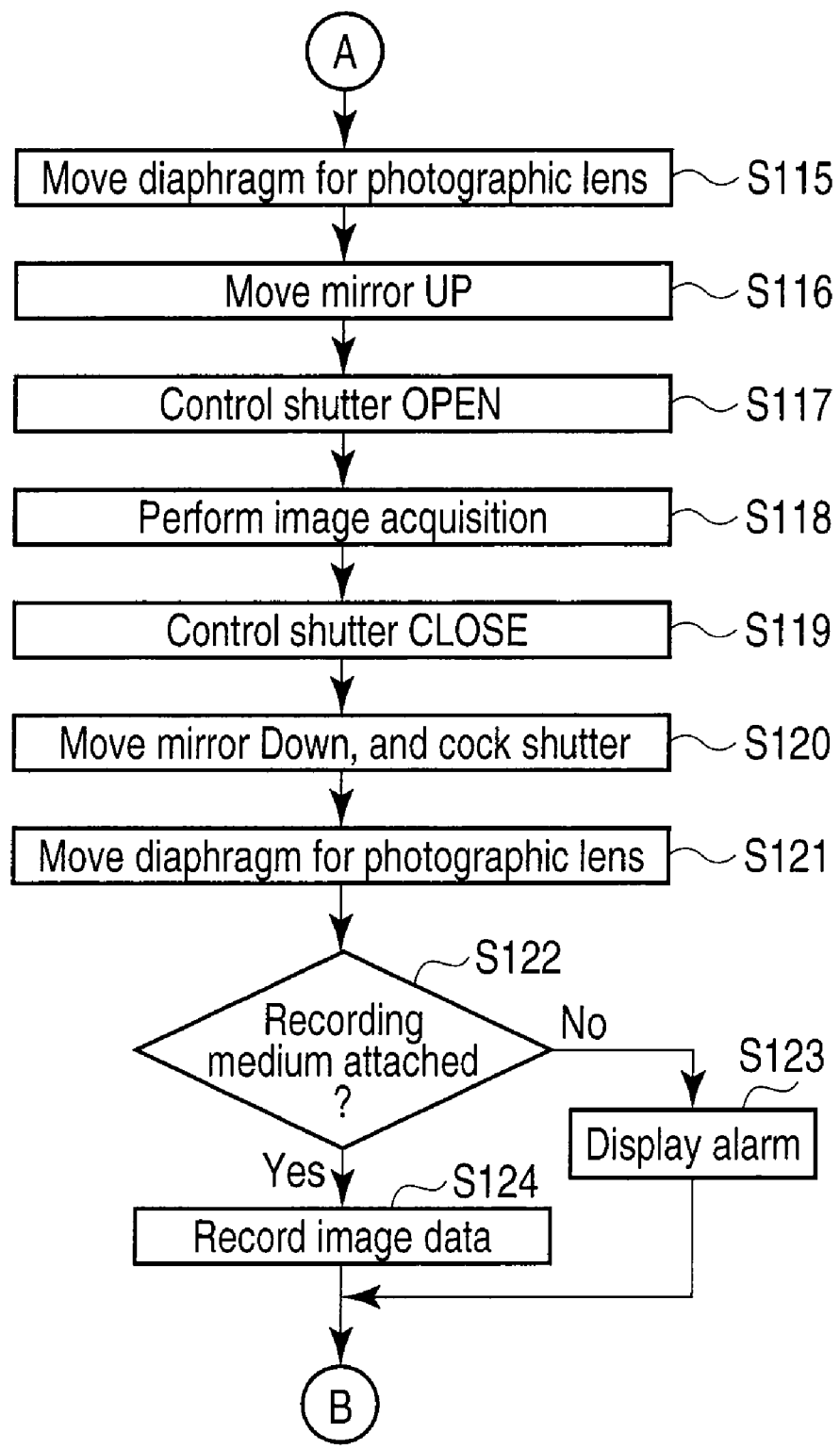
FIG. 17B is the second part of the flowchart showing the exemplary camera sequence (main routine)

To explain the above-described characteristics in detail, the control the Bucom 101 performs will be described with reference to FIGS. 17A to 21. FIGS. 17A and 17B show the flowchart that relates to the control program, which the Bucom 101 starts executing when the power switch (not shown) provided on the body unit 100 of the camera 10 is turned on.

First, a process is performed to activate the digital camera 10 (Step S101). That is, the Bucom 101 control the power-supply circuit 136. So controlled, the power-supply circuit 136 supplies power to the other circuit units of the digital camera 10. Further, the Bucom 101 initializes the circuit components.

Next, the Bucom 101 calls a sub-routine "silent vibration," vibrating the dust filter 119, making no sound (that is, at a frequency falling outside the audible range) (Step S102). The "audible range" ranges from about 200 to 20,000 Hz, because most people can hear sound falling within this range.

Steps S103 to S124, which follow, make a group of steps that is cyclically repeated. That is, the Bucom 101 first detects whether an accessory has been attached to, or detached from, the digital camera 10 (Step S103). Whether the lens unit 200 (i.e., one of accessories), for example, has been attached to the body unit 100 is detected. This detection, e.g., attaching or detaching of the lens unit 200, is performed as the Bucom 101 communicates with the Lucom 201.

If a specific accessory is detected to have been attached to the body unit 100 (YES in Step S104), the Bucom 101 calls a subroutine "silent vibration" and causes the dust filter 119 to vibrate silently (Step S105).

While an accessory, particularly the lens unit 200, remains not attached to the body unit 100 that is the camera body, dust is likely to adhere to each lens, the dust filter 119, and the like. It is therefore desirable to perform an operation of removing dust at the time when it is detected that the lens unit 200 is attached to the body unit 100. It is highly possible that dust adheres as the outer air circulates in the body unit 100 at the time a lens is exchanged with another. It is therefore advisable to remove dust when a lens is exchange with another. Then, it is determined that photography will be immediately performed, and the operation goes to Step S106.

If a specific accessory is not detected to have been attached to the body unit 100 (NO in Step S104), the Bucom 101 goes to the next step, i.e., Step S106.

In Step S106, the Bucom 101 detects the state of a specific operation switch that the digital camera 10 has.

That is, the Bucom 101 determines whether the first release switch (not shown), which is a release switch, has been operated from the on/off state of the switch (Step S107). The Bucom 101 reads the state. If the first release switch has not been turned on for a predetermined time, the Bucom 101 discriminates the state of the power switch (Step S108). If the power switch is on, the Bucom 101 returns to Step S103. If the power switch is off, the Bucom 101 performs an end-operation (e.g., sleep).

On the other hand, the first release switch may be found to have been turned on in Step S107. In this case, the Bucom 101 acquires the luminance data about the object, from the photometry circuit 115, and calculates from this data an exposure time (Tv value) and a diaphragm value (Av value) that are optimal for the image acquisition unit 116 and lens unit 200, respectively (Step S109).

Thereafter, the Bucom 101 acquires the detection data from the AF sensor unit 109 through the AF sensor drive circuit 110, and calculates a defocus value from the detection data (Step S110). The Bucom 101 then determines whether the defocus value, thus calculated, falls within a preset tolerance range (Step S111). If the defocus value does not fall within the tolerance range, the Bucom 101 drives the photographic lens 202 (Step S112) and returns to Step S103.

On the other hand, the defocus value may falls within the tolerance range. In this case, the Bucom 101 calls the subroutine "silent vibration" and causes the dust filter 119 to vibrate silently (Step S113).

Further, the Bucom 101 determines whether the second release switch (not shown), which is another release switch, has been operated (Step S114). If the second release switch is on, the Bucom 101 goes to Step S115 and starts the prescribed photographic operation (later described in detail). If the second release switch is off, the Bucom 101 returns to Step S108.

During the image acquisition operation, the electronic image acquisition is controlled for a time that corresponds to the preset time for exposure (i.e., exposure time), as in ordinary photography.

As the above-mentioned photographic operation, Steps S115 to S121 are performed in a prescribed order to photograph an object. First, the Bucom 101 transmits the Av value to the Lucom 201, instructing the Lucom 201 to drive the diaphragm 203 (Step S115). Thereafter, the Bucom 101 moves the quick return mirror 105 to the up position (Step S116). Then, the Bucom 101 causes the front curtain of the shutter 108 to start running, performing open control (Step S117). Further, the Bucom 101 makes the image process controller 127 perform "image acquisition operation" (Step S118). When the exposure to the CCD 117 (i.e., photography) for the time corresponding to the Tv value ends, the Bucom 101 causes the rear curtain of the shutter 108 to start running, achieving CLOSE control (Step S119). Then, the Bucom 101 drives the quick return mirror 105 to the down position and cocks the shutter 108 (Step S120).

Then, the Bucom 101 instructs the Lucom 210 to move the diaphragm 203 back to the open position (Step S121). Thus, a sequence of image acquisition steps is terminated.

Next, the Bucom 101 determines whether the recording medium 128 is attached to the body unit 100 (Step S122). If the recording medium 128 is not attached, the Bucom 101 displays an alarm (Step S123). The Bucom 101 then returns to Step S103 and repeats a similar sequence of steps.

If the recording medium 128 is attached, the Bucom 101 instructs the image process controller 127 to record the image data acquired by photography, in the recording medium 128 (Step S124). When the image data is completely recorded, the Bucom 101 returns to Step S103 again and repeats a similar sequence of steps.

Figure 22:
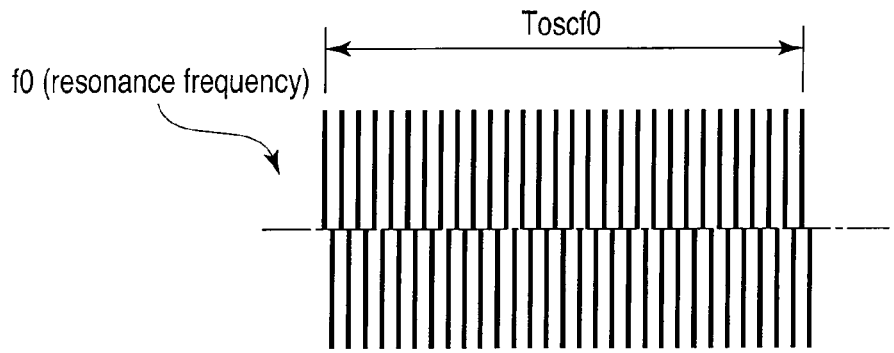
FIG. 22 is a diagram showing the form of a resonance-frequency wave continuously supplied to vibrating members during silent vibration.

In regard to the detailed relation between the vibration state and the displaying state will be explained in detail, the sequence of controlling the "silent vibration" subroutine will be explained with reference to FIGS. 18 to 21. The term "vibration state" means the state of the vibration induced by the piezoelectric elements 120*a* and 120*b*, i.e., vibrating members. FIG. 22 shows the form of a resonance-frequency wave that is continuously supplied to the vibrating members during silent vibration. The subroutine of FIG. 18, i.e., "silent vibration," and the subroutine of FIGS. 19 to 21, i.e., "display process" are routines for accomplishing vibration exclusively for removing dust from the dust filter 119. Vibrational frequency $f_0$ is set to a value close to the resonance frequency of the dust filter 119. In the vibrational mode of FIG. 4A, for example, the vibrational frequency is 80 kHz, higher than at least 20 kHz, and produces sound not audible to the user.

As shown in FIG. 18, when the "silent vibration" is called, the Bucom 101 first reads the data representing the drive time (Toscf0) and drive frequency (resonance frequency: Noscf0) from the data stored in a specific area of the nonvolatile memory 129 (Step S201). At this timing, the Bucom 101 causes the display unit provided in the operation display LCD 130 or operation display LED 131 to turn on the vibrational mode display, as shown in FIG. 19 (Step S301). The Bucom 101 then determines whether a predetermined time has passed (Step S302). If the predetermined time has not passed, the Bucom 101 makes the display unit keep turning on the vibrational mode display. Upon lapse of the predetermined time, the Bucom 101 turns off the displaying of the vibrational mode display (Step S303).

Next, the Bucom 101 outputs the drive frequency Noscf0 from the output port D_NCnt to the N-scale counter 187 of the dust filter control circuit 122 (Step S202).

In the following steps S203 to S205, the dust is removed as will be described below. First, the Bucom 101 sets the output port P_PwCont to High, thereby starting the dust removal (Step S203). At this timing, the Bucom 101 starts displaying the vibrating operation as shown in FIG. 20 (Step S311). The Bucom 101 then determines whether or not the predetermined time has passed (Step S312). If the predetermined time has not passed, the Bucom 101 keeps displaying the vibrating operation. Upon lapse of the predetermined time, the Bucom 101 stops displaying of the vibrating operation (Step S313). The display of the vibrating operation, at this time, changes as the time passes or as the dust is removed (how it changes is not shown, though). The predetermined time is almost equal to Toscf0, i.e., the time for which the vibration (later described) continues.

If the output port P_PwCont is set to High in Step S203, the piezoelectric elements 120*a* and 120*b* vibrate the dust filter 119 at the prescribed vibrational frequency (Noscf0), removing the dust 184 from the surface of the dust filter 119. At the same time the dust is removed from the surface of the dust filter 119, air is vibrated, producing an ultrasonic wave. The vibration at the drive frequency Noscf0, however, does not make sound audible to most people. Hence, the user hears nothing. The Bucom 101 waits for the predetermined time Toscf0, while the dust filter 119 remains vibrated (Step S204). Upon lapse of the predetermined time Toscf0, the Bucom 101 sets the output port P_PwCont to Low, stopping the dust removal operation (Step S205). At this timing, the Bucom 101 turns on the display unit, whereby the displaying of the vibration-end display is turned on (Step S321). When the Bucom 101 determines (in Step S322) that the predetermined time has passed, the displaying of the vibration-end display is turned off (Step S323). The Bucom 101 then returns to the step next to the step in which the "silent vibration" is called.

The vibrational frequency $f_0$ (i.e., resonance frequency Noscf0) and the drive time (Toscf0) used in this subroutine define such a waveform as shown in the graph of FIG. 22. As can be seen from this waveform, constant vibration ($f_0$=80 kHz) continues for a time (i.e., Toscf0) that is long enough to accomplish the dust removal.

That is, the vibrational mode adjusts the resonance frequency applied to the vibrating member, controlling the dust removal.

Second Embodiment

Figure 23:
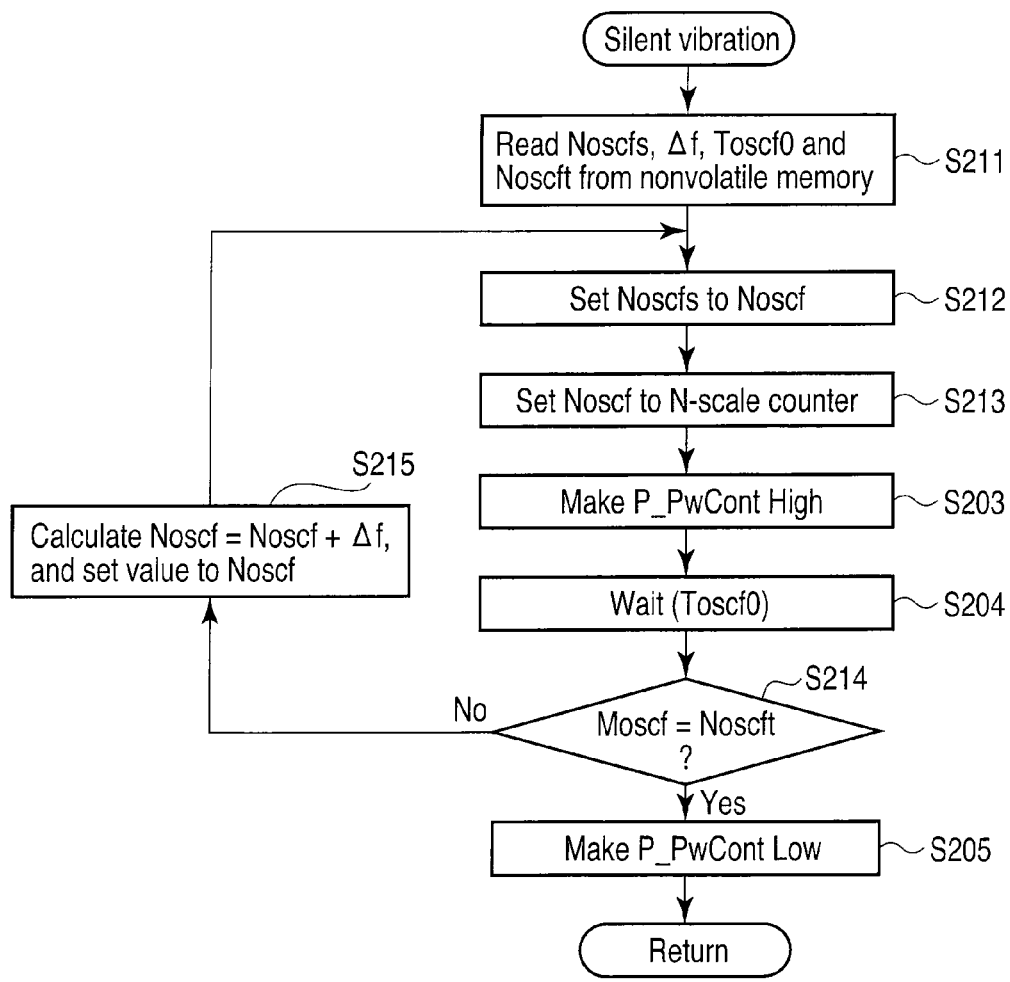
FIG. 23 is a flowchart showing the operating sequence of "silent vibration," i.e., subroutine in the operating sequence of the digital camera that is a second embodiment of the image equipment according to the present invention.

The subroutine "silent vibration" called in the camera sequence (main routine) that the Bucom performs in a digital camera that is a second embodiment of the image equipment according to this invention will be described with reference to FIG. 23. FIG. 23 illustrates a modification of the subroutine "silent vibration" shown in FIG. 18. The second embodiment differs from the first embodiment in the operating mode of the dust filter 119. In the first embodiment, the dust filter 119 is driven at a fixed frequency, i.e., frequency $f_0$, producing a standing wave. By contrast, in the second embodiment, the drive frequency is gradually changed, thereby achieving large-amplitude vibration at various frequencies including the resonance frequency, without strictly controlling the drive frequency.

The resonance frequency will change and the vibration speed ratio will decrease as shown in FIG. 6 if the length ratio of the piezoelectric elements changes from the design value during the manufacture. Therefore, a precise resonance frequency must be set in each product and the piezoelectric elements 120*a* and 120*b* must be driven at the frequency so set. An extremely simple circuit configuration can, nonetheless, drive the piezoelectric elements precisely at the resonance frequency if the frequency is controlled as in the second embodiment. A method of control can therefore be achieved to eliminate any difference in resonance frequency between the products.

In the subroutine "silent vibration" of FIG. 23, the vibrational frequency $f_0$ is set to a value close to the resonance frequency of the dust filter 119. The vibrational frequency $f_0$ is 80 kHz in, for example, the vibrational mode of FIG. 4A. That is, the vibrational frequency exceeds at least 20 kHz, and makes sound not audible to the user.

First, the Bucom 101 reads the data representing the drive time (Toscf0), drive-start frequency (Noscfs), frequency change value (Δf) and drive-end frequency (Noscft), from the data stored in a specific area of the nonvolatile memory 129 (Step S211). At this timing, the Bucom 101 causes the display unit to display the vibrational mode as shown in FIG. 19, in the same way as in the first embodiment.

Next, the Bucom 101 sets the drive-start frequency (Noscfs) as drive frequency (Noscf) (Step S212). The Bucom 101 then outputs the drive frequency (Noscf) from the output port D_NCnt to the N-scale counter 187 of the dust filter control circuit 122 (Step S213).

In the following steps S203 et seq., the dust is removed as will be described below. First, the dust removal is started. At this time, the display of the vibrating operation is performed as shown in FIG. 20, as in the first embodiment.

First, the Bucom 101 sets the output port P_PwCont to High, to achieve dust removal (Step S203). The piezoelectric elements 120a and 120b vibrate the dust filter 119 at the prescribed vibrational frequency (Noscf), producing a standing wave of a small amplitude at the dust filter 119. The dust cannot be removed from the surface of the dust filter 119, because the vibrational amplitude is small. This vibration continues for the drive time (Toscf0) (Step S204). Upon lapse of this drive time (Toscf0), the Bucom 101 determines whether the drive frequency (Noscf) is equal to the drive-end frequency (Noscft) (Step S214). If the drive frequency is not equal to the drive-end frequency (NO in Step S214), the Bucom 101 adds the frequency change value ($\Delta f$) to the drive frequency (Noscf), and sets the sum to the drive frequency (Noscf) (Step S215). Then, the Bucom 101 repeats the sequence of Steps S212 to S214.

If the drive frequency (Noscf) is equal to the drive-end frequency (Noscft) (YES in Step S214), the Bucom 101 sets the output port P_PwCont to Low, stopping the vibration of the piezoelectric elements 120a and 120b (Step S205), thereby terminating the "silent vibration." At this point, the display of vibration-end is performed as shown in FIG. 21, as in the first embodiment.

As the frequency is gradually changed as described above, the amplitude of the standing wave increases. In view of this, the drive-start frequency (Noscfs), the frequency change value ($\Delta f$) and the drive-end frequency (Noscft) are set so that the resonance frequency of the standing wave may be surpassed. As a result, a standing wave of small vibrational amplitude is produced at the dust filter 119. The standing wave can thereby controlled, such that its vibrational amplitude gradually increases until it becomes resonance vibration, and then decreases thereafter. If the vibrational amplitude (corresponding to vibration speed) is larger than a prescribed value, the dust 184 can be removed. In other words, the dust 184 can be removed while the vibrational frequency remains in a prescribed range. This range is broad in the present embodiment, because the vibrational amplitude is large during the resonance.

If the difference between the drive-start frequency (Noscfs) and the drive-end frequency (Noscft) is large, the fluctuation of the resonance frequency, due to the temperature of the vibrator 173 or to the deviation in characteristic change of the vibrator 173, during the manufacture, can be absorbed. Hence, the dust 184 can be reliably removed from the dust filter 119, by using an extremely simple circuit configuration.

The present invention has been explained, describing some embodiments. Nonetheless, this invention is not limited to the embodiments described above. Various changes and modifications can, of course, be made within the scope and spirit of the invention.

For example, a mechanism that applies an air flow or a mechanism that has a wipe may be used in combination with the dust removal mechanism having the vibrating member, in order to remove the dust 184 from the dust filter 119.

In the embodiments described above, the vibrating members are piezoelectric elements. The piezoelectric elements may be replaced by electrostrictive members or super nagnetostrictive elements. In the embodiments, two piezoelectric elements 120a and 120b are secured to the dust filter 119 that is dust-screening member. Instead, only one piezoelectric element may be secured to the dust filter 119. In this case, that side of the dust filter 119, to which the piezoelectric element is secured, differs in rigidity from the other side of the dust filter 119. Consequently, the node areas 178 where vibrational amplitude is small will form a pattern similar to that of FIGS. 4A and 8, but will be dislocated. Thus, it is desirable to arrange two piezoelectric elements symmetrical to each other, because the vibration can be produced more efficiently and the dust filter 119 can be more easily held at four corners.

In order to remove dust more efficiently from the member vibrated, the member may be coated with an indium-tin oxide (ITO) film, which is a transparent conductive film, indium-zinc film, poly 3,4-ethylenedioxy thiophene film, surfactant agent film that is a hygroscopic anti-electrostatic film, siloxane-based film, or the like. In this case, the frequency, the drive time, etc., all related to the vibration, and the positions of the elastic members 121, are set to values that accord with the material of the film.

Moreover, the optical LPF 118, described as one embodiment of the invention, may be replaced by a plurality of optical LPFs that exhibit birefringence. Of these optical LPFs, the optical LPF located closest to the object of photography may be used as a dust-screening member (i.e., a subject to be vibrated), in place of the dust filter 119 shown in FIG. 2A.

Figure 2B:
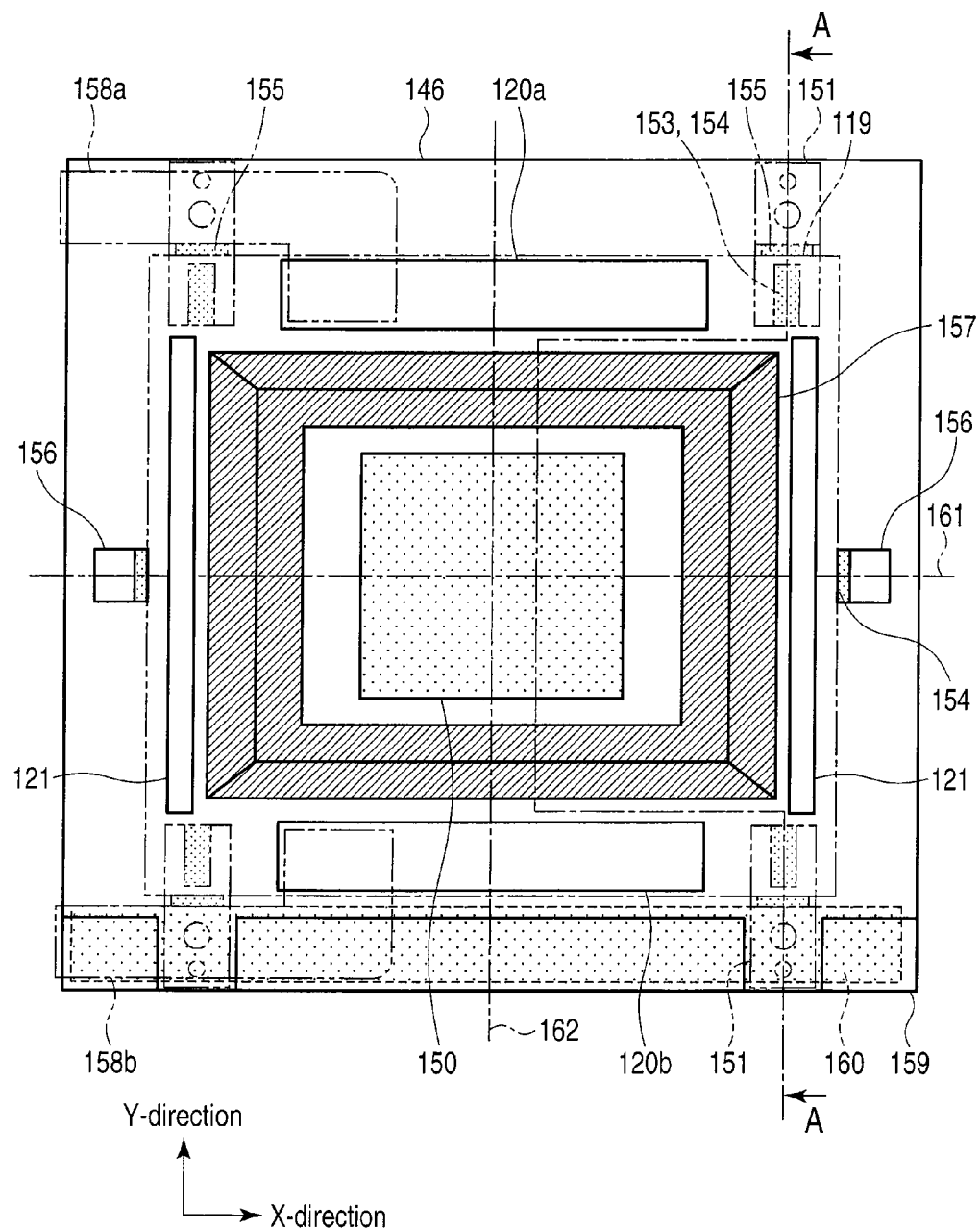
FIG. 2B is a front view of the dust removal mechanism, as viewed from the lens side.

Further, a camera may does not have the optical LPF 118 of FIG. 2A described as one embodiment of the invention, and the dust filter 119 may be used as an optical element such as an optical LPF, an infrared-beam filter, a deflection filter, or a half mirror.

Furthermore, the camera may not have the optical LPF 118, and the dust filter 119 may be replaced by the protection glass plate 143 shown in FIG. 2A. In this case, the protection glass plate 143 and the CCD chip 137 remain free of dust and moisture, and the structure of FIG. 2A that supports and yet vibrates the dust filter 119 may be used to support and vibrate the protection glass plate 143. Needless to say, the protection glass plate 143 may be used as an optical element such as an optical LPF, an infrared-beam filter, a deflection filter, or a half mirror.

The embodiment described above uses elastic members 121. Nonetheless, the elastic members 121 need not be used if the dust-screening member and/or the vibrating members are designed or arranged so that the vibrator 173 may have bending rigidity ratio Eix/Eiy of about 0.4 or more, but less than 1.

The image equipment according to this invention is not limited to the image acquisition apparatus (digital camera) exemplified above. This invention can be applied to any other apparatus that needs a dust removal function. The invention can be practiced in the form of various modifications, if necessary. More specifically, a dust moving mechanism according to this invention may be arranged between the display element and the light source or image projecting lens in an image projector.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A vibrating device comprising:
   a dust-screening member which is shaped like a plate as a whole and has at least one side that is symmetric to the X-axis that is a given axis of symmetry;
   a vibrating member secured to the dust-screening member and configured to produce, at the dust-screening member, vibration having a vibrational amplitude perpendicular to a surface of the dust-screening member; and
   a drive unit configured to drive the vibrating member to produce vibration Z (x, y) at the dust-screening member, the vibration being expressed as follows:

$$Z(x,y)=W_{mn}(x,y)\cdot\cos(\gamma)+W_{nm}(x,y)\cdot\sin(\gamma)$$

where Z (x, y) is vibration at a given point P (x, y) on the dust-screening member; m and n are positive integers including 0, indicating the order of natural vibration corresponding to a vibrational mode;

$$W_{mn}(x, y) = \sin\left(n\pi \cdot x + \frac{\pi}{2}\right) \cdot \sin\left(m\pi \cdot y + \frac{\pi}{2}\right);$$
   $$W_{nm}(x, y) = \sin\left(m\pi \cdot x + \frac{\pi}{2}\right) \cdot \sin\left(n\pi \cdot y + \frac{\pi}{2}\right); \text{ and}$$

γ is +π/4 or ranges from −π/8 to −π/4; and
   a ratio between a first bending rigidity along the X-axis of at least the dust-screening member and vibrating member in the section orthogonal to the X-axis at the intersection of the X- and Y-axes, to a second bending rigidity along the Y-axis of at least the dust-screening member in the section orthogonal to the Y-axis at the intersection is 0.4 or more, but less than 1.0, the Y-axis being orthogonal to the X-axis in a virtual rectangle which has the same area as the surface of the dust-screening member, and which has long sides including the one side of the dust-screening member.

2. The device according to claim 1, wherein
   γ is +π/4, and
   the vibration produced at the dust-screening member by the drive unit is vibration such that peak ridges of the vibration having a vibrational amplitude perpendicular to the surface of the dust-screening member form closed loops.

3. The device according to claim 1, wherein
   γ ranges from −π/8 to −π/4, and
   the vibration produced at the dust-screening member by the drive unit is vibration such that peak ridges of the vibration having a vibrational amplitude perpendicular to the surface of the dust-screening member form curves around a midpoint of the side which the dust-screening member has.

4. The device according to claim 1, wherein
   the vibrating member includes a piezoelectric element, and
   the drive unit configured to supply a signal to the piezoelectric element to produce the vibration at the dust-screening member, the signal having a frequency that accords with a size and material of the dust-screening member.

5. The device according to claim 4, wherein the drive unit configured to supply a signal to the piezoelectric element at prescribed time intervals, the signal changing in frequency, from a drive-start frequency to a drive-end frequency in increments of a given transmutation frequency, including the frequency that accords with the with size and material of the dust-screening member.

6. The device according to claim 1, wherein a plurality of vibrating members are provided on the dust-screening member.

7. A vibrating device comprising:
   a dust-screening member which is shaped like a plate as a whole and has at least one side that is symmetric to the X-axis that is a given axis of symmetry;
   a vibrating member secured to the dust-screening member and configured to produce, at the dust-screening member, vibration having a vibrational amplitude perpendicular to a surface of the dust-screening member; and
   a drive unit configured to drive the vibrating member to produce vibration Z (x, y) at the dust-screening member, the vibration being expressed as follows:

$$Z(x,y)=W_{mn}(x,y)\cdot\cos(\gamma)+W_{nm}(x,y)\cdot\sin(\gamma)$$

where Z (x, y) is vibration at a given point P (x, y) on the dust-screening member; m and n are positive integers including 0, indicating the order of natural vibration corresponding to a vibrational mode;

$$W_{mn}(x, y) = \sin\left(n\pi \cdot x + \frac{\pi}{2}\right) \cdot \sin\left(m\pi \cdot y + \frac{\pi}{2}\right);$$
   $$W_{nm}(x, y) = \sin\left(m\pi \cdot x + \frac{\pi}{2}\right) \cdot \sin\left(n\pi \cdot y + \frac{\pi}{2}\right); \text{ and}$$

γ is +π/4 or ranges from −π/8 to −π/4; and
   a ratio between a first bending rigidity along the X-axis of at least the dust-screening member in the section orthogonal to the X-axis at the intersection of the X- and Y-axes, to a second bending rigidity along the Y-axis of at least the dust-screening member in the section orthogonal to the Y-axis at the intersection is 0.4 or more, but less than 1.0, the Y-axis being orthogonal to the X-axis in a virtual rectangle which has the same area as the surface of the dust-screening member, and which has long sides including the one side of the dust-screening member.

8. An image equipment comprising:
   an image forming element having an image surface on which an optical image is formed;
   a dust-screening member which is shaped like a plate as a whole, has at least one side that is symmetric to the X-axis that is a given axis of symmetry, and has a light-transmitting region at least flaring in a radial direction from the center, facing the image surface and spaced therefrom by a predetermined distance;
   a vibrating member configured to produce vibration having an amplitude perpendicular to a surface of the dust-screening member, the vibrating member being provided on the dust-screening member, outside the light-transmitting region through which a light beam forming an optical image on the image surface passes;
   a sealing structure for surrounding the image forming element and the dust-screening member, thereby providing a closed space in which the image forming element and the dust-screening member that face each other; and
   a drive unit configured to drive the vibrating member to produce vibration Z (x, y) at the dust-screening member, the vibration being expressed as follows:

$$Z(x,y)=W_{mn}(x,y)\cdot\cos(\gamma)+W_{nm}(x,y)\cdot\sin(\gamma)$$

where Z (x, y) is vibration at a given point P (x, y) on the dust-screening member; m and n are positive integers including 0, indicating the order of natural vibration corresponding to a vibrational mode;

$$W_{mn}(x, y) = \sin\left(n\pi \cdot x + \frac{\pi}{2}\right) \cdot \sin\left(m\pi \cdot y + \frac{\pi}{2}\right);$$

$$W_{nm}(x, y) = \sin\left(m\pi \cdot x + \frac{\pi}{2}\right) \cdot \sin\left(n\pi \cdot y + \frac{\pi}{2}\right); \text{ and}$$

γ is +π/4 or ranges from −π/8 to −π/4, wherein
a ratio between a first bending rigidity along the X-axis of at least the dust-screening member and vibrating member in the section orthogonal to the X-axis at the intersection of the X- and Y-axes, to a second bending rigidity along the Y-axis of at least the dust-screening member in the section orthogonal to the Y-axis at the intersection is 0.4 or more, but less than 1.0, the Y-axis being orthogonal to the X-axis in a virtual rectangle which has the same area as the surface of the dust-screening member, and which has long sides including the one side of the dust-screening member.

9. The equipment according to claim 8, wherein
γ is +π/4, and
the drive unit produces at the dust-screening member vibration such that peak ridges of the vibration having a vibrational amplitude perpendicular to the surface of the dust-screening member form closed loops around an optical axis that passes the image surface of the image forming element.

10. The equipment according to claim 9, wherein the sealing structure includes:
a holder arranged so as to achieve airtight sealing between the image forming element and the dust-screening member; and
a support member configured to secure the dust-screening member to the holder, the support member being arranged in a node region that has almost no vibrational amplitude perpendicular to a surface of the dust-screening member.

11. The equipment according to claim 8, wherein
when γ is −π/8 to −π/4, and
the drive unit produces at the dust-screening member vibration such that peak ridges of the vibration having a vibrational amplitude perpendicular to the surface of the dust-screening member form curves surrounding a midpoint of the side which the dust-screening member has.

12. The equipment according to claim 11, wherein the sealing structure includes:
a holder arranged so as to achieve airtight sealing between the image forming element and the dust-screening member; and
a support member configured to secure the dust-screening member to the holder, the support member being arranged in a node region that has almost no vibrational amplitude perpendicular to a surface of the dust-screening member.

13. The equipment according to claim 8, wherein
the vibrating member includes a piezoelectric element, and
the drive unit configured to supply a signal to the piezoelectric element to produce the vibration at the dust-screening member, the signal having a frequency that accords with a size and material of the dust-screening member.

14. The equipment according to claim 13, wherein the drive unit configured to supply a signal to the piezoelectric element at prescribed time intervals, the signal changing in frequency, from a drive-start frequency to a drive-end frequency in increments of a given transmutation frequency, including the frequency that accords with the with size and material of the dust-screening member.

15. The equipment according to claim 8, wherein vibrating members including the vibrating member are opposed across a transmission region of the dust-screening member, through which light passes.

16. An image equipment comprising:
an image forming element having an image surface on which an optical image is formed;
a dust-screening member which is shaped like a plate as a whole, has at least one side that is symmetric to the X-axis that is a given axis of symmetry, and has a light-transmitting region at least flaring in a radial direction from the center, facing the image surface and spaced therefrom by a predetermined distance;
a vibrating member configured to produce vibration having an amplitude perpendicular to a surface of the dust-screening member, the vibrating member being provided on the dust-screening member, outside the light-transmitting region through which a light beam forming an optical image on the image surface passes;
a sealing structure for surrounding the image forming element and the dust-screening member, thereby providing a closed space in which the image forming element and the dust-screening member that face each other; and
a drive unit configured to drive the vibrating member to produce vibration Z (x, y) at the dust-screening member, the vibration being expressed as follows:

$$Z(x,y) = W_{mn}(x,y) \cdot \cos(\gamma) + W_{nm}(x,y) \cdot \sin(\gamma)$$

where Z (x, y) is vibration at a given point P (x, y) on the dust-screening member; m and n are positive integers including 0, indicating the order of natural vibration corresponding to a vibrational mode;

$$W_{mn}(x, y) = \sin\left(n\pi \cdot x + \frac{\pi}{2}\right) \cdot \sin\left(m\pi \cdot y + \frac{\pi}{2}\right);$$

$$W_{nm}(x, y) = \sin\left(m\pi \cdot x + \frac{\pi}{2}\right) \cdot \sin\left(n\pi \cdot y + \frac{\pi}{2}\right); \text{ and}$$

γ is +π/4 or ranges from −π/8 to −π/4, wherein
a ratio between a first bending rigidity along the X-axis of at least the dust-screening member in the section orthogonal to the X-axis at the intersection of the X- and Y-axes, to a second bending rigidity along the Y-axis of at least the dust-screening member in the section orthogonal to the Y-axis at the intersection is 0.4 or more, but less than 1.0, the Y-axis being orthogonal to the X-axis in a virtual rectangle which has the same area as the surface of the dust-screening member, and which has long sides including the one side of the dust-screening member.

* * * * *